(12) United States Patent
Kang et al.

(10) Patent No.: US 10,694,376 B2
(45) Date of Patent: Jun. 23, 2020

(54) NETWORK AUTHENTICATION METHOD, NETWORK DEVICE, TERMINAL DEVICE, AND STORAGE MEDIUM

(71) Applicant: Huawei International Pte. Ltd., Singapore (SG)

(72) Inventors: Xin Kang, Singapore (SG); Haiguang Wang, Singapore (SG); Zhongding Lei, Singapore (SG); Fei Liu, Singapore (SG)

(73) Assignee: Huawei International Pte., Ltd., Singapore (SG)

( * ) Notice: Subject to any disclaimer, the term of this patent is extended or adjusted under 35 U.S.C. 154(b) by 0 days.

(21) Appl. No.: 16/673,467

(22) Filed: Nov. 4, 2019

(65) Prior Publication Data

US 2020/0068397 A1 Feb. 27, 2020

Related U.S. Application Data

(63) Continuation of application No. PCT/SG2018/050069, filed on Feb. 14, 2018.

(30) Foreign Application Priority Data

May 9, 2017 (WO) ................ PCT/SG2017/050242

(51) Int. Cl.
*H04M 3/16* (2006.01)
*H04W 12/04* (2009.01)
*H04L 29/06* (2006.01)
*H04W 8/02* (2009.01)
*H04W 56/00* (2009.01)
*H04W 12/00* (2009.01)

(52) U.S. Cl.
CPC ... *H04W 12/04031* (2019.01); *H04L 63/0435* (2013.01); *H04L 63/0823* (2013.01); *H04W 8/02* (2013.01); *H04W 12/0051* (2019.01); *H04W 12/0401* (2019.01); *H04W 56/001* (2013.01)

(58) Field of Classification Search
CPC ............ H04W 12/04031; H04W 8/02; H04W 56/001; H04W 12/0401; H04W 12/0051; H04L 63/0435; H04L 63/0823
USPC .......................................... 455/411; 370/338
See application file for complete search history.

(56) References Cited

U.S. PATENT DOCUMENTS

2010/0011220 A1 1/2010 Zhao et al.
2014/0171029 A1* 6/2014 Holtmanns ....... H04W 12/0401
455/411

FOREIGN PATENT DOCUMENTS

EP 1768426 A1 3/2007
WO 2009048574 A2 4/2009

* cited by examiner

*Primary Examiner* — Marcos Batista
(74) *Attorney, Agent, or Firm* — Leydig, Voit & Mayer, Ltd.

(57) ABSTRACT

This application provides a network authentication method, a network device, a terminal device, and a storage medium. In one aspect, in this application, a network device generates a symmetric key by itself, and generates a correct sequence number of a terminal device in real time by using a first sequence number. In other words, in this application, the network device does not need to store the symmetric key and the correct sequence number of the terminal device, but generates the symmetric key and the correct sequence number of the terminal device in real time. Therefore, storage load of an HSS in the prior art can be reduced.

20 Claims, 32 Drawing Sheets

NETWORK AUTHENTICATION METHOD, NETWORK DEVICE, TERMINAL DEVICE, AND STORAGE MEDIUM

CROSS-REFERENCE TO RELATED APPLICATIONS

This application is a continuation of International Application No. PCT/SG2018/050069, filed on Feb. 14, 2018, which claims priority to International Application No. PCT/SG2017/050242, filed on May 9, 2017. The disclosures of the aforementioned applications are hereby incorporated by reference in their entireties.

TECHNICAL FIELD

This application relates to the field of communications technologies, and in particular, to a network authentication method, a network device, a terminal device, and a storage medium.

BACKGROUND

The Internet of Things (IoT) is an important application scenario of a 5th generation (5G) mobile communications technology. A terminal device on the IoT needs to perform network authentication when accessing a 5G network. FIG. 1A and FIG. 1B are a schematic diagram of interactions performed when a terminal device performs network authentication in the prior art. The authentication process is as follows:

Step S101: A terminal device sends a network access request to a mobility management entity (MME). Step S102: The MME sends a network access data request to a home subscriber server (HSS). Step S103: The HSS receives the network access data request and determines a symmetric key K corresponding to the terminal device, where the symmetric key is stored in the HSS; and then calculates authentication vectors based on the symmetric key K, where the authentication vectors include an authentication token ($AUTN_{HSS}$), an expected response (XRES), and an access security management key ($K_{ASME}$). Step S104: The HSS sends the authentication vectors to the MME. Step S105: The MME receives and stores the authentication vectors. Step S106: The MME initiates a user authentication request to the terminal device, where the user authentication request includes a random number RAND, the $AUTN_{HSS}$, and the $K_{ASME}$. Step S107: The terminal device receives the RAND and the $AUTN_{HSS}$ and performs an operation by using the authentication and key agreement (AKA) key derivation algorithm of a third generation mobile communications network of an evolved packet system (EPS), where input parameters for the operation include the symmetric key K, the RAND, a serving network (SN) identifier, and a sequence number (SQN) of the terminal device, and output parameters for the operation include a user-side authentication token $AUTN_{UE}$, a response (RES), and a $K_{ASME}$. Step S108: When determining that the $AUTN_{UE}$ and the $AUTN_{HSS}$ are the same, the terminal device generates a session key for the terminal device and a network side based on the $K_{ASME}$. Step S109: The terminal device sends the RES obtained through the operation to the MME. Step S110: The MME receives the RES, and generates a session key between the network side and the terminal device based on the $K_{ASME}$ when determining that the received RES is the same as the XRES in the authentication vectors.

A disadvantage in the prior art is that a large quantity of terminal devices on the IoT need to perform network authentication with the HSS. Therefore, the HSS needs to store a symmetric key and an SQN that are corresponding to each terminal device. This centralized storage causes severe load pressure on the HSS. In addition, the terminal device, the MME, and the HSS need to interact with each other to implement the network authentication process, which causes a problem that a network authentication chain is relatively long, thereby affecting network authentication efficiency.

SUMMARY

This application provides a network authentication method, a network device, a terminal device, and a storage medium. Therefore, storage load of an HSS in the prior art can be reduced, and because a device such as an MME is not required to perform network authentication between the terminal device and the network device in this application, a network authentication chain can be shortened, and network authentication efficiency can be improved.

According to a first aspect, this application provides a network authentication method, including: obtaining, by a network device, an identity of a terminal device; generating, by the network device, a symmetric key on the network device side based on the identity of the terminal device and a first key of the network device; generating, by the network device, a first sequence number for the terminal device; determining, by the network device, a correct sequence number of the terminal device based on the first sequence number; generating, by the network device, a first authentication token based on the symmetric key on the network device side, the correct sequence number, a first random number, and an authentication management field parameter configured by the network device for the terminal device, where the authentication management field parameter is used to limit parameters involved in the network authentication process of the terminal device; sending, by the network device, the first random number and the first authentication token to the terminal device, so that the terminal device authenticates the network device based on the first authentication token and a second authentication token, where the second authentication token is generated by the terminal device based on a symmetric key on the terminal device side, the first random number, the correct sequence number, and the authentication management field parameter; receiving, by the network device, an authentication response message sent by the terminal device, where the authentication response message includes a first authentication parameter, and the first authentication parameter is generated based on the first random number and the symmetric key on the terminal device side; generating, by the network device, a second authentication parameter based on the symmetric key on the network device side and the first random number; and authenticating, by the network device, the terminal device based on the first authentication parameter and the second authentication parameter.

A beneficial effect of this application is as follows: The network device generates the symmetric key by itself, and in addition, generates the correct sequence number of the terminal device in real time by using the first sequence number. In other words, in this application, the network device does not need to store the symmetric key and the correct sequence number of the terminal device, but generates the symmetric key and the correct sequence number of the terminal device in real time. Therefore, storage load of an HSS in the prior art can be reduced, and because a device such as an MME is not required to perform network authentication between the terminal device and the network device in this application, a network authentication chain can be shortened, and network authentication efficiency can be improved.

Optionally, the first key is a private key of the network device, or the first key is a public key corresponding to a plurality of terminal devices that include the terminal device.

In other words, the symmetric key on the network device side may be effectively generated or derived by using the two kinds of first keys. Therefore, the symmetric key does not need to be stored, so that the storage load of the HSS can be reduced.

Optionally, the first sequence number is a sequence number generated by the network device based on current time information, and the first sequence number is the same as the correct sequence number.

Optionally, the first sequence number is a pseudo sequence number of the terminal device. Correspondingly, the determining, by the network device, a correct sequence number of the terminal device based on the first sequence number includes: generating, by the network device, a third authentication token based on the symmetric key on the network device side, the pseudo sequence number, a second random number, and the authentication management field parameter; sending, by the network device, the second random number and the third authentication token to the terminal device, so that the terminal device determines the pseudo sequence number based on the symmetric key on the terminal device side, the third authentication token, the second random number, and the authentication management field parameter; receiving, by the network device, a resynchronization message sent by the terminal device, where the resynchronization message includes a resynchronization parameter and a third random number; and determining, by the network device, the correct sequence number based on the resynchronization parameter and the third random number.

In other words, the correct sequence number of the terminal device can be effectively determined in the two manners, so that the correct sequence number of the terminal device does not need to be stored, thereby reducing the storage load of the HSS.

Optionally, an identity of the network device is the second random number, or an identity of the network device is carried in the authentication management field parameter, so that the terminal device generates the symmetric key on the terminal device side based on the identity of the network device and a private key of the terminal device.

In other words, in this application, the identity of the network device is used to replace the second random number. Alternatively, the identity of the network device is carried in the authentication management field parameter. The identity of the network device can be transmitted in the two manners, so as to reduce network overheads.

Optionally, the method further includes: when the network device is an access network device, sending, by the network device, a broadcast message, where the broadcast message includes an identity of the network device, so that the terminal device generates the symmetric key on the terminal device side based on the identity of the network device and the private key of the terminal device.

The following describes a network authentication method executed by a terminal device. An implementation principle and a technical effect of the network authentication method executed by the terminal device are similar to the foregoing principle and technical effect, and details are not described herein again.

According to a second aspect, this application provides a network authentication method, including: sending, by a terminal device, an identity of the terminal device to a network device, so that the network device generates a symmetric key on the network device side based on the identity of the terminal device and a first key of the network device; receiving, by the terminal device, a first random number and a first authentication token that are sent by the network device, where the first authentication token is generated by the network device based on the symmetric key on the network device side, a correct sequence number of the terminal device, the first random number, and an authentication management field parameter configured by the network device for the terminal device, and the authentication management field parameter is used to limit parameters involved in the network authentication process of the terminal device; determining, by the terminal device, the correct sequence number based on the first authentication token, a symmetric key on the terminal device side, the first random number, and the authentication management field parameter; generating, by the terminal device, a second authentication token based on the symmetric key on the terminal device side, the first random number, the correct sequence number, and the authentication management field parameter; authenticating, by the terminal device, the network device based on the first authentication token and the second authentication token; generating, by the terminal device, a first authentication parameter based on the first random number and the symmetric key on the terminal device side; and sending, by the terminal device, an authentication response message to the network device, where the authentication response message includes the first authentication parameter; and the first authentication parameter is used by the network device to authenticate the terminal device.

Optionally, the first key is a private key of the network device, or the first key is a public key corresponding to a plurality of terminal devices that include the terminal device.

Optionally, the correct sequence number is determined by the network device by using a first sequence number.

Optionally, the first sequence number is a sequence number generated by the network device based on current time information, and the first sequence number is the same as the correct sequence number.

Optionally, the first sequence number is a pseudo sequence number of the terminal device. The method further includes: receiving, by the terminal device, a second random number and a third authentication token that are sent by the network device, where the third authentication token is generated by the network device based on the symmetric key on the network device side, the pseudo sequence number, the second random number, and the authentication management field parameter; determining, by the terminal device, the pseudo sequence number based on the symmetric key on the terminal device side, the third authentication token, the second random number, and the authentication management field parameter; generating, by the terminal device, a resynchronization parameter based on the correct sequence number, a third random number, the authentication management field parameter, and the symmetric key on the terminal device side; and sending, by the terminal device, a resynchronization message to the network device, where the resynchronization message includes the resynchronization parameter and the third random number, so that the network device determines the correct sequence number based on the resynchronization parameter and the third random number.

Optionally, an identity of the network device is the second random number, or an identity of the network device is carried in the authentication management field parameter; and the method further includes: generating, by the terminal device, the symmetric key on the terminal device side based on the identity of the network device and a private key of the terminal device.

Optionally, the method further includes: when the network device is an access network device, receiving, by the terminal device, a broadcast message sent by the network device, where the broadcast message includes an identity of the network device; and generating, by the terminal device, the symmetric key on the terminal device side based on the identity of the network device and the private key of the terminal device.

The following describes a network device. The network device may be configured to execute the first aspect and the optional manners corresponding to the first aspect. Implementation principles and technical effects of the network device are similar, and details are not described herein again.

According to a third aspect, this application provides a network device, including a processor, a receiver, a transmitter, and a memory. The memory stores code, and when the code is run by the processor, the terminal device executes the method according to the first aspect or any optional manner of the first aspect. Specifically, the processor is configured to obtain an identity of a terminal device; generate a symmetric key on the network device side based on the identity of the terminal device and a first key of the network device; generate a first sequence number for the terminal device; determine a correct sequence number of the terminal device based on the first sequence number; and generate a first authentication token based on the symmetric key on the network device side, the correct sequence number, a first random number, and an authentication management field parameter configured by the network device for the terminal device, where the authentication management field parameter is used to limit parameters involved in the network authentication process of the terminal device. The transmitter is configured to send the first random number and the first authentication token to the terminal device, so that the terminal device authenticates the network device based on the first authentication token and a second authentication token, where the second authentication token is generated by the terminal device based on a symmetric key on the terminal device side, the first random number, the correct sequence number, and the authentication management field parameter. The receiver is configured to receive an authentication response message sent by the terminal device, where the authentication response message includes a first authentication parameter, and the first authentication parameter is generated based on the first random number and the symmetric key on the terminal device side. The processor is further configured to: generate a second authentication parameter based on the symmetric key on the network device side and the first random number; and authenticate the terminal device based on the first authentication parameter and the second authentication parameter.

Optionally, the first key is a private key of the network device, or the first key is a public key corresponding to a plurality of terminal devices that include the terminal device.

Optionally, the first sequence number is a sequence number generated by the network device based on current time information, and the first sequence number is the same as the correct sequence number.

Optionally, the first sequence number is a pseudo sequence number of the terminal device. Correspondingly, the processor is specifically configured to generate a third authentication token based on the symmetric key on the network device side, the pseudo sequence number, a second random number, and the authentication management field parameter. The transmitter is further configured to send the second random number and the third authentication token, so that the terminal device determines the pseudo sequence number based on the symmetric key on the terminal device side, the third authentication token, the second random number, and the authentication management field parameter. The receiver is further configured to receive a resynchronization message sent by the terminal device, where the resynchronization message includes a resynchronization parameter and a third random number. The processor is specifically configured to determine the correct sequence number based on the resynchronization parameter and the third random number.

Optionally, an identity of the network device is the second random number, or an identity of the network device is carried in the authentication management field parameter, so that the terminal device generates the symmetric key on the terminal device side based on the identity of the network device and a private key of the terminal device.

Optionally, when the network device is an access network device, the transmitter is further configured to send a broadcast message, where the broadcast message includes an identity of the network device, so that the terminal device generates the symmetric key on the terminal device side based on the identity of the network device and the private key of the terminal device.

The following describes a terminal device. The terminal device may be configured to execute the second aspect and the optional manners corresponding to the second aspect. Implementation principles and technical effects of the terminal device are similar, and details are not described herein again.

According to a fourth aspect, this application provides a terminal device, including a transmitter, a receiver, a memory, and a processor. The memory stores code, and when the code is run by the processor, the terminal device executes the method according to the second aspect or any optional manner of the second aspect. Specifically, the transmitter is configured to send an identity of a terminal device to a network device, so that the network device generates a symmetric key on the network device side based on the identity of the terminal device and a first key of the network device. The receiver is configured to receive a first random number and a first authentication token that are sent by the network device, where the first authentication token is generated by the network device based on the symmetric key on the network device side, a correct sequence number of the terminal device, the first random number, and an authentication management field parameter configured by the network device for the terminal device, and the authentication management field parameter is used to limit parameters involved in the network authentication process of the terminal device. The processor is configured to: determine the correct sequence number based on the first authentication token, a symmetric key on the terminal device side, the first random number, and the authentication management field parameter; generate a second authentication token based on the symmetric key on the terminal device side, the first random number, the correct sequence number, and the authentication management field parameter; authenticate the network device based on the first authentication token and the second authentication token; and generate a first authentication parameter based on the first random number and the symmetric key on the terminal device side. The transmitter is further configured to send an authentication response message to the network device, where the authentication response message includes the first authentication parameter; and the first authentication parameter is used by the network device to authenticate the terminal device.

Optionally, the first key is a private key of the network device, or the first key is a public key corresponding to a plurality of terminal devices that include the terminal device.

Optionally, the correct sequence number is determined by the network device by using a first sequence number.

Optionally, the first sequence number is a sequence number generated by the network device based on current time information, and the first sequence number is the same as the correct sequence number.

Optionally, the first sequence number is a pseudo sequence number of the terminal device. The receiver is further configured to receive a second random number and a third authentication token that are sent by the network device, where the third authentication token is generated by the network device based on the symmetric key on the network device side, the pseudo sequence number, the second random number, and the authentication management field parameter. The processor is further configured to: determine the pseudo sequence number based on the symmetric key on the terminal device side, the third authentication token, the second random number, and the authentication management field parameter; and generate a resynchronization parameter based on the correct sequence number, a third random number, the authentication management field parameter, and the symmetric key on the terminal device side. The transmitter is further configured to send a resynchronization message to the network device, where the resynchronization message includes the resynchronization parameter and the third random number, so that the network device determines the correct sequence number based on the resynchronization parameter and the third random number.

Optionally, an identity of the network device is the second random number, or an identity of the network device is carried in the authentication management field parameter. The processor is further configured to generate the symmetric key on the terminal device side based on the identity of the network device and a private key of the terminal device.

Optionally, when the network device is an access network device, the receiver is further configured to receive a broadcast message sent by the network device, where the broadcast message includes an identity of the network device. The processor is further configured to generate the symmetric key on the terminal device side based on the identity of the network device and the private key of the terminal device.

According to a fifth aspect, this application provides a computer storage medium, configured to store a computer software instruction used by the foregoing network device, including a program designed for executing the foregoing first aspect.

According to a sixth aspect, an embodiment of this application provides a computer storage medium, configured to store a computer software instruction used for the foregoing terminal device, and the computer software instruction includes a program that is designed to execute the foregoing second aspect.

According to a seventh aspect, an embodiment of this application provides a computer program product, including an instruction. When the computer program is executed by a computer, the instruction enables the computer to perform functions performed by the network device in the foregoing first and alternative method.

According to an eighth aspect, an embodiment of this application provides a computer program product, including an instruction. When the computer program is executed by a computer, the instruction enables the computer to perform functions performed by the terminal device in the foregoing second and alternative method.

According to a ninth aspect, this application provides a network authentication method, including:
obtaining, by a first network device, an identifier of a terminal device;
determining, by the first network device based on the identifier of the terminal device, a target network authentication manner to be used between network side devices and the terminal device; and
sending, by the first network device, indication information to a second network device, where the indication information is used to indicate the target network authentication manner.

According to a tenth aspect, this application provides a network authentication method, including:
receiving, by a second network device, indication information, where the indication information is used to indicate a target network authentication manner to be used between network side devices and a terminal device; and
sending, by the second network device, a message based on the target network authentication manner.

According to an eleventh aspect, this application provides a network authentication method, including:
obtaining, by a first network device, an identifier of a terminal device;
determining, by the first network device based on the identifier of the terminal device, whether a target network authentication manner is to be used between the network side devices and the terminal device; and
sending, by the first network device, indication information to a second network device, where the indication information is used to indicate whether the target network authentication manner is to be used between the network side devices and the terminal device.

According to a twelfth aspect, this application provides a network authentication method, including:
receiving, by a second network device, indication information, where the indication information is used to indicate whether a target network authentication manner is to be used between network side devices and a terminal device; and
sending, by the second network device, a message based on the indication information.

According to a thirteenth aspect, this application provides a network device, where the network device is a first network device and includes:
an obtaining module, configured to obtain an identifier of a terminal device;
a determining module, configured to determine, based on the identifier of the terminal device, a target network authentication manner to be used between network side devices and the terminal device; and a sending module, configured to send indication information to a second network device, where the indication information is used to indicate the target network authentication manner.

According to a fourteenth aspect, this application provides a network device, where the network device is a second network device and includes:

a receiving module, configured to receive indication information, where the indication information is used to indicate a target network authentication manner to be used between network side devices and a terminal device; and a sending module, configured to send a message based on the target network authentication manner.

According to a fifteenth aspect, this application provides a network device, where the network device is a first network device and includes:

an obtaining module, configured to obtain an identifier of a terminal device;

a determining module, configured to determine, based on the identifier of the terminal device, whether a target network authentication manner is to be used between network side devices and the terminal device; and a sending module, configured to send indication information to a second network device, where the indication information is used to indicate whether the target network authentication manner is to be used between the network side devices and the terminal device.

According to a sixteenth aspect, this application provides a network device, where the network device is a second network device and includes:

a receiving module, configured to receive indication information, where the indication information is used to indicate whether a target network authentication manner is to be used between network side devices and a terminal device; and a sending module, configured to send a message based on the indication information.

According to a seventeenth aspect, this application provides a network device, including a processor, a transmitter, and a memory, where the memory is configured to store code, and when the code is run by the processor, the processor is configured to:
obtain an identifier of a terminal device; and
determine, based on the identifier of the terminal device, a target network authentication manner to be used between network side devices and the terminal device; and the transmitter is configured to send indication information to a second network device, where the indication information is used to indicate the target network authentication manner.

According to an eighteenth aspect, this application provides a network device, including:

a receiver, configured to receive indication information, where the indication information is used to indicate a target network authentication manner to be used between network side devices and a terminal device; and a transmitter, configured to send a message based on the target network authentication manner.

According to a nineteenth aspect, this application provides a network device, including:

a processor, a transmitter, and a memory, where
the memory is configured to store code, and when the code is run by the processor, the processor is configured to:
obtain an identifier of a terminal device; and
determine, based on the identifier of the terminal device, whether a target network authentication manner is to be used between network side devices and the terminal device; and the transmitter is configured to send indication information to a second network device, where the indication information is used to indicate whether the target network authentication manner is to be used between the network side devices and the terminal device.

According to a twentieth aspect, this application provides a network device, including:

a receiver, configured to receive indication information, where the indication information is used to indicate whether a target network authentication manner is to be used between network side devices and a terminal device; and a transmitter, configured to send a message based on the indication information.

In an optional manner of any one of the ninth aspect to the twentieth aspect, the indication information is carried in an authentication vector sent by the first network device to the second network device.

According to a twenty-first aspect, an embodiment of this application provides a computer storage medium, configured to store an instruction, so as to implement the method according to the ninth aspect or the optional manner of the ninth aspect.

According to a twenty-second aspect, an embodiment of this application provides a computer program product, including an instruction, so as to implement the method according to the ninth aspect or the optional manner of the ninth aspect.

According to a twenty-third aspect, an embodiment of this application provides a computer storage medium, configured to store an instruction, so as to implement the method according to the tenth aspect or the optional manner of the tenth aspect.

According to a twenty-fourth aspect, an embodiment of this application provides a computer program product, including an instruction, so as to implement the method according to the tenth aspect or the optional manner of the tenth aspect.

According to a twenty-fifth aspect, an embodiment of this application provides a computer storage medium, configured to store an instruction, so as to implement the method according to the eleventh aspect or the optional manner of the eleventh aspect.

According to a twenty-sixth aspect, an embodiment of this application provides a computer program product, including an instruction, so as to implement the method according to the eleventh aspect or the optional manner of the eleventh aspect.

According to a twenty-seventh aspect, an embodiment of this application provides a computer storage medium, configured to store an instruction, so as to implement the method according to the twelfth aspect or the optional manner of the twelfth aspect.

According to a twenty-eighth aspect, an embodiment of this application provides a computer program product, including an instruction, so as to implement the method according to the twelfth aspect or the optional manner of the twelfth aspect.

This application provides a network authentication method, a network device, a terminal device, and a storage medium. The method includes: obtaining, by a network device, an identity of a terminal device; generating, by the network device, a symmetric key on the network device side based on the identity of the terminal device and a first key of the network device; generating, by the network device, a first sequence number for the terminal device; determining, by the network device, a correct sequence number of the terminal device based on the first sequence number; generating, by the network device, a first authentication token based on the symmetric key on the network device side, the correct sequence number, a first random number, and an authentication management field parameter configured by the network device for the terminal device, where the authentication management field parameter is used to limit parameters involved in the network authentication process of the terminal device; sending, by the network device, the first random number and the first authentication token to the terminal device, so that the terminal device authenticates the network device based on the first authentication token and a second authentication token, where the second authentication token is generated by the terminal device based on a symmetric key on the terminal device side, the first random number, the correct sequence number, and the authentication management field parameter; receiving, by the network device, an authentication response message sent by the terminal device, where the authentication response message includes a first authentication parameter, and the first authentication parameter is generated based on the first random number and the symmetric key on the terminal device side; generating, by the network device, a second authentication parameter based on the symmetric key on the network device side and the first random number; and authenticating, by the network device, the terminal device based on the first authentication parameter and the second authentication parameter. The network device generates the symmetric key by itself, and in addition, generates the correct sequence number of the terminal device in real time by using the first sequence number. In other words, in this application, the network device does not need to store the symmetric key and the correct sequence number of the terminal device, but generates the symmetric key and the correct sequence number of the terminal device in real time. Therefore, storage load of an HS S in the prior art can be reduced, and because a device such as an MME is not required to perform network authentication between the terminal device and the network device in this application, a network authentication chain can be shortened, and network authentication efficiency can be improved.

DESCRIPTION OF EMBODIMENTS

A terminal device involved in this application may be referred to as an Internet of Things (IoT) device. The terminal device may be a terminal device that may access the IoT, such as a computer, a mobile phone, a printer, a refrigerator, a robot, a sensor, an electricity meter, or a water meter.

A network device involved in this application is a device that can perform network authentication with the terminal device. The network device may be an access network device, for example, may be a base transceiver station (BTS) in a global system for mobile communications (GSM) or code division multiple access (CDMA), may be a NodeB in wideband code division multiple access (WCDMA), may be an evolved NodeB (eNB), an access point (AP), or a relay station in a long term evolution (LTE) network, or may be a base station in a 5G network or a new radio access technology (NR). This is not limited herein. The network device may alternatively be a core network device, for example, may be an MME or an authentication security function (AUSF).

It should be noted that the network device may be any device that has an authentication unit (Authentication Unit, or Authentication Function, AU or AF). The following uses an example in which this application is applied to a network architecture of future mobile communication to describe in detail a location of a network device.

Figure 1A:
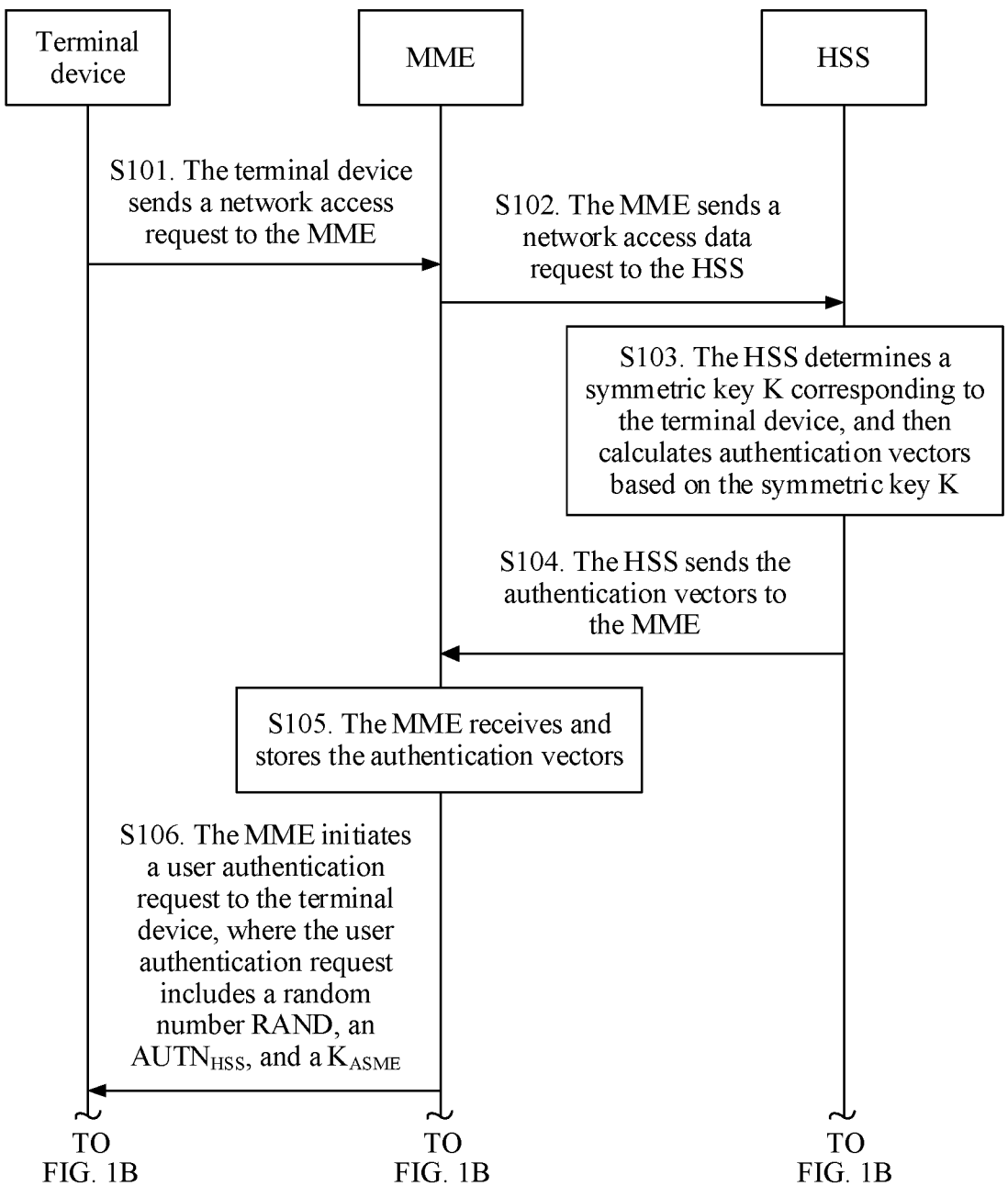
FIG. 1A and FIG. 1B are a schematic diagram of interactions performed when a terminal device performs network authentication in the prior art.
Figure 1B:
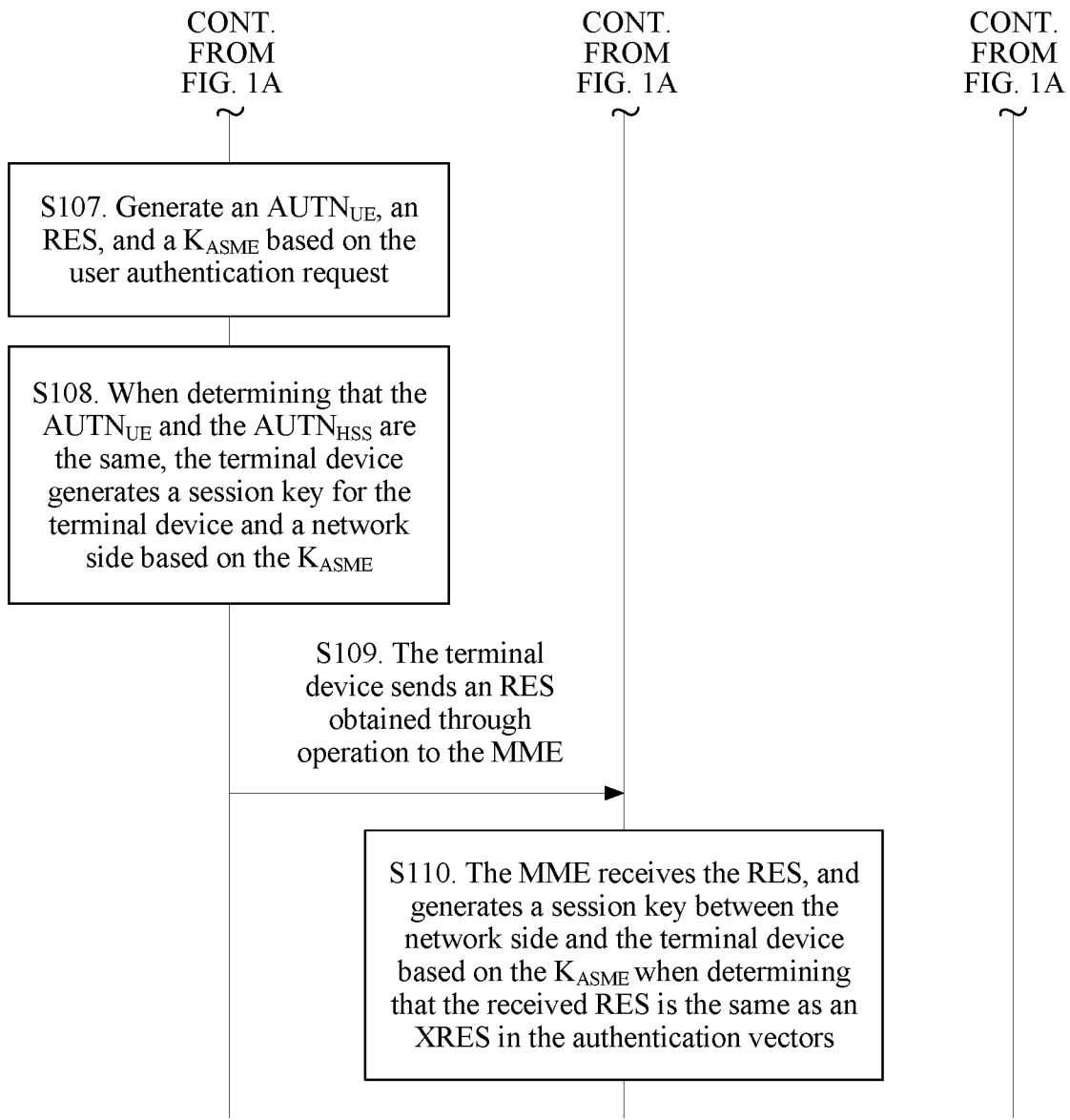
Figure 2:
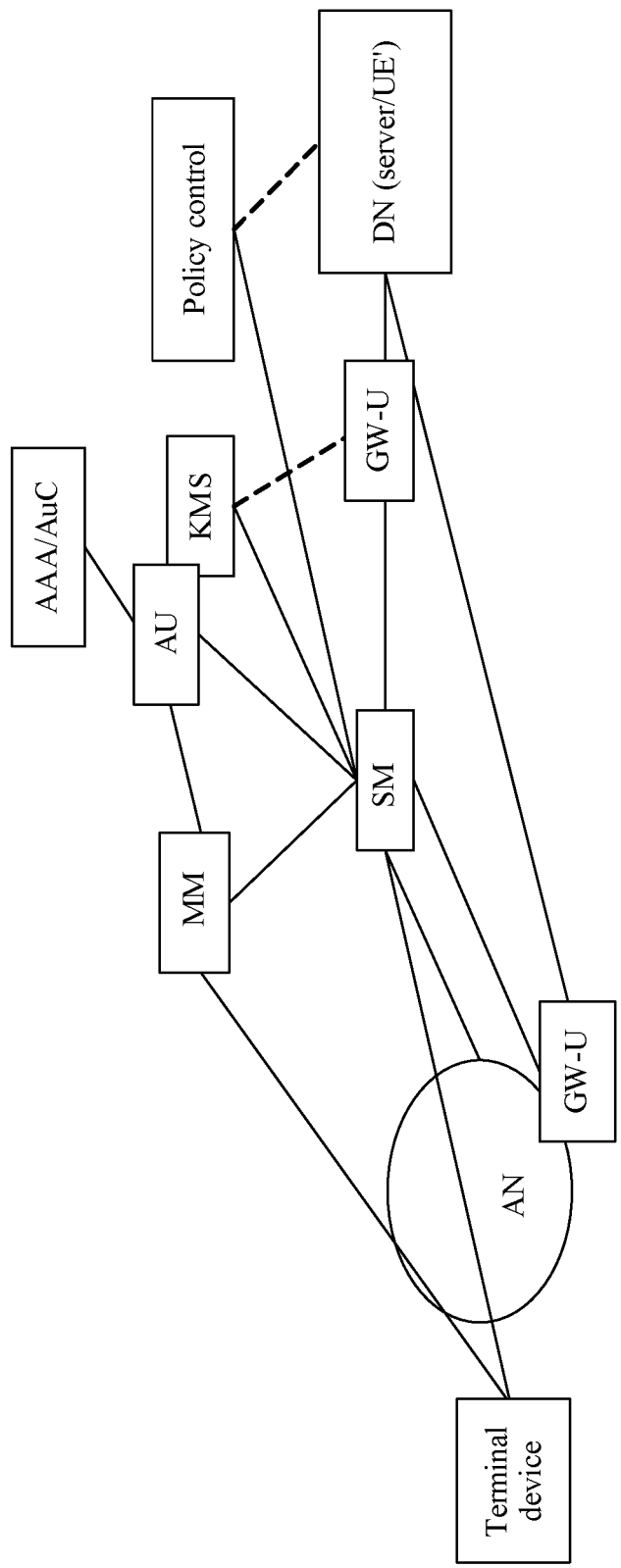
FIG. 2 is a schematic diagram of a network architecture of future mobile communication.

FIG. 2 is a schematic diagram of a network architecture of future mobile communication.

A terminal device accesses a carrier network by using an access network (AN). The AN includes a base station.

The carrier network includes:

a mobility management (MM) network element;

a session management (SM) network element, configured to set up and manage a session, a slice, a flow, or a bearer;

an authentication unit AU or AF, configured to perform bidirectional network authentication with the terminal device, where the AU may be separately deployed as an independent logical functional entity, or may be deployed inside the MM or the SM, that is, the MM or the SM plays the role of the AU; certainly, the AU may alternatively be deployed on the base station in the AN, which is not limited in this application; and when the AU is deployed in the MM, the MM is the foregoing network device, when the AU is deployed in the SM, the SM is the foregoing network device, or when the AU is deployed on the base station, the base station is the foregoing network device;

a server node or a home subscriber server of a carrier, including an authentication, authorization and accounting (AAA) server, the home subscriber server (HSS), an authentication center (AuC), or a subscriber repository of the carrier;

a policy control network element used for policy negotiation;

a key management center (KMS), which is responsible for key generation, management, and negotiation, and supports lawful interception, where the KMS may be separately deployed as an independent logical functional entity, or may be deployed inside the AU, the MM, or the SM, that is, the AU, the MM, or the SM plays the role of the KMS;

a gateway, also referred to as a user plane-gateway (UP-GW), and configured to connect the carrier network and a data network (DN), where the AN may also be connected to the DN by using the GW; and a DN server, including an application server, a service server, or the like, where the DN server may be deployed in the carrier network, or may be deployed outside the carrier network.

It should be noted that FIG. 2 shows a logical relationship between network elements. In practice, the MM, the AU, and the SM each may be deployed independently, or may be deployed in one entity through pairwise integration. For example, the SM and the MM are deployed in one entity, and the AU is deployed independently; or the SM and the AU are deployed in one entity, and the MM is deployed independently.

It should be noted that this application is not limited to network authentication in the foregoing future network architecture, and may be further applied to any application scenario that has network authentication in 2G; 3G; 4G; 5G; NR, and a wireless fidelity (Wi-Fi) network.

The prior art has the following problem: Centralized storage causes severe load pressure on the HSS; and in addition, a terminal device, an MME, and an HSS need to interact with each other to implement the network authentication process, which causes a problem that a network authentication chain is relatively long, thereby affecting network authentication efficiency. To resolve the problem, this application provides a network authentication method, a network device, a terminal device, and a storage medium.

Figure 3A:
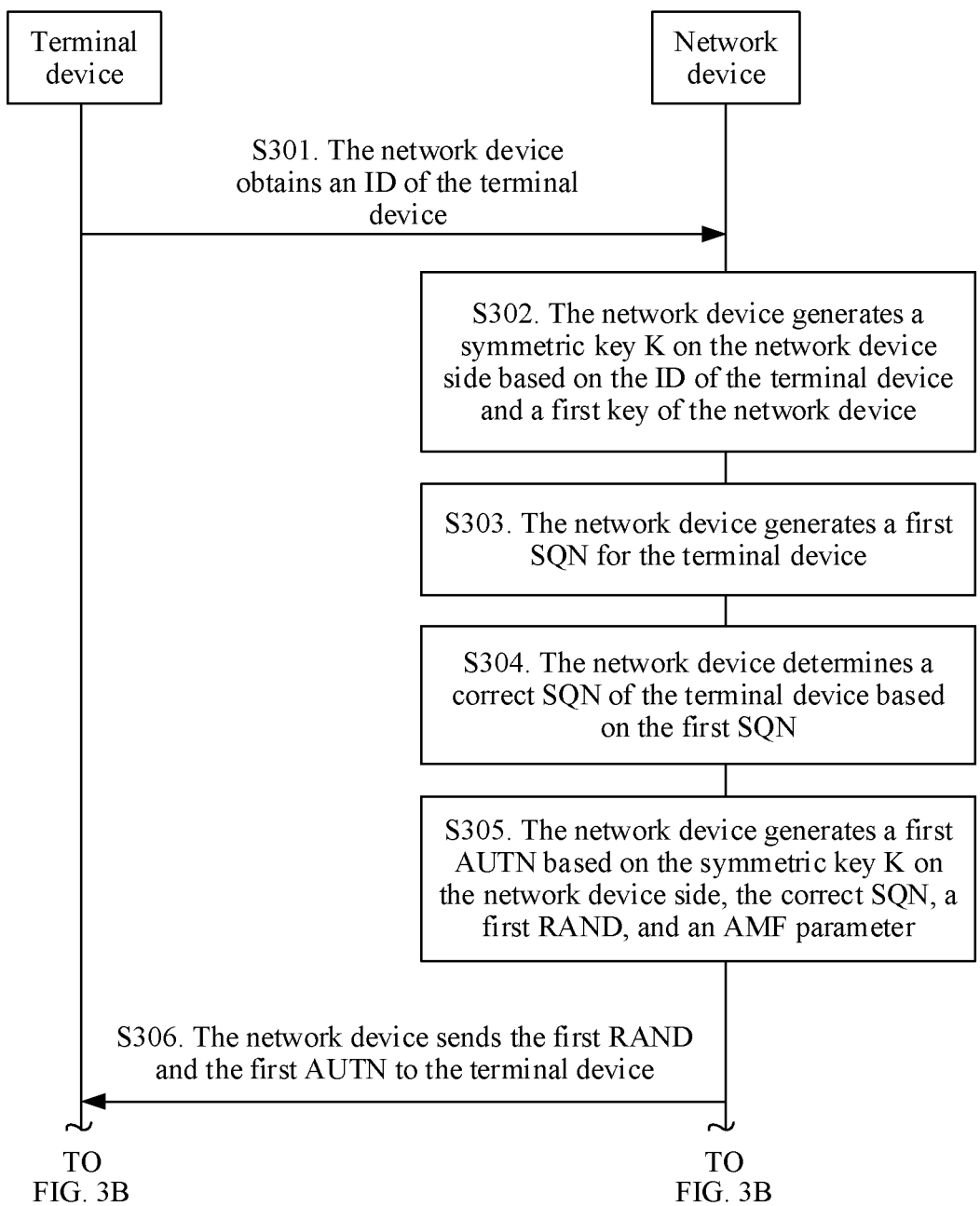
FIG. 3A and FIG. 3B are an interaction flowchart of a network authentication method according to an embodiment of this application.
Figure 3B:
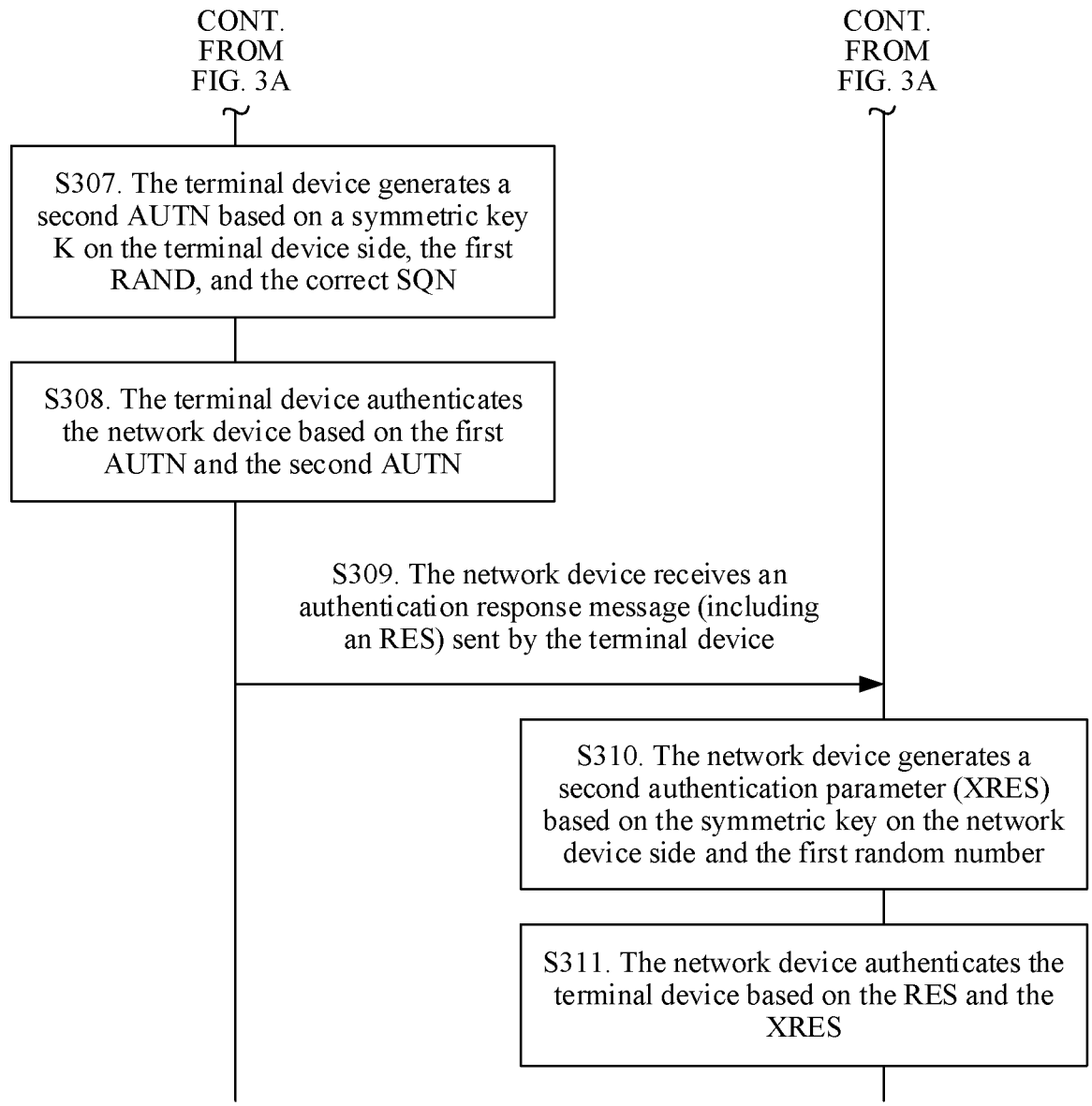

Specifically, FIG. 3A and FIG. 3B are an interaction flowchart of a network authentication method according to an embodiment of this application. As shown in FIG. 3A and FIG. 3B, the method includes the following steps.

Step S301: A network device obtains an identity (ID) of a terminal device.

The ID of the terminal device may be a media access control (MAC) address, an Internet protocol (IP) address, a mobile phone number, an international mobile equipment identity (IMEI), an international mobile subscriber identity (IMSI), an IP multimedia private identity (IMPI), a temporary mobile subscriber identity (TMSI), an IP multimedia public identity (IMPU), a globally unique temporary UE identity (GUTI), or the like. Any identifier that can uniquely identify the terminal device may be used as the ID of the terminal device. This is not limited in this application.

Step S302: The network device generates a symmetric key K on the network device side based on the ID of the terminal device and a first key of the network device.

The symmetric key K on the network device side is a symmetric key between the network device and the terminal device.

In this application, there are two optional manners for generating the symmetric key of the network side device.

In one optional manner, the first key is a private key of the network device. The network device generates the symmetric key K on the network device side according to identity-based cryptography (IBC).

Specifically, the IBC includes an identity based signature (IBS) technology and an identity based encryption (IBE) technology. The terminal device and the network device each have a private/public key pair. A public key is a meaningful character string (identity), such as an email address or a telephone number. A private key is generated by a private key generator (PKG) based on an ID of a device and a master private key of the PKG The symmetric key K of the network side device is generated by using the private key of the network side device and the ID of the terminal device. Likewise, a symmetric key K of the terminal device is generated by using a private key of the terminal device and an ID of the network device. Generating a symmetric key K based on a private key and an ID of an opposite party may be implemented based on pairing in the prior art, or may be implemented by using an IBS cryptography technology based on RFC 6507 and an algorithm such as static Diffie-Helleman performed based on an elliptic curve group. This is not limited in this application.

In the other optional manner, the first key is a public key corresponding to a plurality of terminal devices that include the terminal device. The network device may derive the symmetric key K on the network device side based on the public key and the ID of the terminal device. It should be emphasized that the network device may establish a network authentication relationship with a plurality of terminal devices. For each terminal device, there is a unique corresponding symmetric key K on the network device side. Therefore, a symmetric key derived by the network device based on the public key and an ID of a terminal device A is a symmetric key K that is on the network device side and that is between the terminal device A and the network device. The symmetric key K may be generated based on the public key and an ID of an opposite party by using a related algorithm in the prior art. This is not limited in this application.

Step S303: The network device generates a first sequence number (SQN) for the terminal device.

Step S304: The network device determines a correct SQN of the terminal device based on the first SQN.

The following is described with reference to step S303 and step S304.

In step S303, there are two optional manners for generating the first SQN.

In one optional manner, the first SQN is an SQN generated by the network device based on current time information. Time between the network device and the terminal device is synchronous. Because time information is unique, the first SQN is certainly the same as the correct SQN in step S304.

In the other optional manner, the first SQN is a pseudo SQN of the terminal device. The pseudo SQN may be a fixed string of digits, or may be a randomly generated string of digits, and a requirement is that a sequence number format and a length requirement in an EPS-AKA are met.

Correspondingly, step S304 includes: First, the network device generates a third authentication token AUTN based on the symmetric key K on the network device side, the pseudo SQN, a second random number RAND, and an authentication management field (AMF) parameter. The AMF is used to limit parameters involved in a network authentication process of the terminal device. For example, the AMF is used to limit an SQN fault tolerance range. The SQN fault tolerance range is a fault tolerance range between the first SQN and the correct SQN. When a difference between the first SQN and the SQN falls within the fault tolerance range, it may be considered that the first SQN is the correct SQN. Otherwise, the first SQN is not the correct SQN. The AMF may further be used to limit a lifecycle of an encryption key and an integrity protection key.

Then, the network device sends the second RAND and the third AUTN to the terminal device, so that the terminal device determines the pseudo SQN based on the symmetric key K on the terminal device side, the third AUTN, the second RAND, and the AMF; the network device receives a resynchronization message sent by the terminal device; and the network device determines the correct SQN of the terminal device based on the resynchronization message.

Specifically, the network device may generate, according to an AKA algorithm provided in the prior art, the third AUTN by using the symmetric key K on the network device side, the pseudo SQN, the second RAND, and the AMF. This is not limited in this application. The AKA algorithm in this application refers to an algorithm involved in the ESP-AKA agreement. The terminal device may determine, according to the AKA algorithm provided in the prior art, the pseudo SQN by using the symmetric key K on the terminal device side, the third AUTN, the second RAND, and the AMF; that is, the pseudo SQN used to calculate the third AUTN may be determined by using the algorithm provided in the prior art. If a difference between the pseudo SQN and the correct SQN falls outside the SQN fault tolerance range, a resynchronization parameter is generated by using the correct SQN, a third RAND, the AMF, and the symmetric key K on the terminal device side. The resynchronization parameter is used for synchronization between the terminal device and the network device, and is used by the network device to determine the correct SQN. The terminal device sends the resynchronization message to the network device, where the resynchronization message includes the third RAND and the resynchronization parameter AUTS. The network device may determine the correct SQN based on the third RAND and the resynchronization parameter AUTS by using the AKA algorithm in the prior art. The algorithm in the prior art is not limited in this application.

In conclusion, a main idea of this optional manner is actually: The network device sends the third AUTN to the terminal device, where the third AUTN is obtained through calculation by using the pseudo SQN, so as to trigger the terminal device to send the correct SQN to the network device.

Step S305: The network device generates a first AUTN based on the symmetric key K on the network device side, the correct SQN, a first RAND, and the AMF parameter.

The network device may generate, according to the AKA algorithm provided in the prior art, the first AUTN by using the symmetric key on the network device side, the correct SQN, the first RAND, and the AMF. A method for generating the first AUTN is the same as the foregoing method for generating the third AUTN. This application sets no limitation on the algorithm in the prior art.

It should be emphasized that a difference between step S305 and the EPS-AKA agreement in the prior art lies in that a correct SQN is stored in an HSS in the prior art. However, in this application, to reduce storage load of the HSS, the network device in this application needs to obtain a correct SQN in real time, and then, the first AUTN is calculated by using a same algorithm as in the prior art.

Step S306: The network device sends the first RAND and the first AUTN to the terminal device.

Step S307: The terminal device generates a second AUTN based on the symmetric key K on the terminal device side, the first RAND, and the correct SQN.

Step S308: The terminal device authenticates the network device based on the first AUTN and the second AUTN.

With reference to step S306 to step S308, the terminal device may generate the second AUTN based on the symmetric key K on the terminal device side, the first RAND, and the correct SQN by using the AKA algorithm provided in the prior art. That the terminal device authenticates the network device based on the first AUTN and the second AUTN includes: When the terminal device determines that the first AUTN and the second AUTN are the same, it indicates that the network device can be authenticated; otherwise, it indicates that the network device fails to be authenticated. Alternatively, when the terminal device determines that a difference value between the first AUTN and the second AUTN is less than a preset threshold, it indicates that the network device can be authenticated; otherwise, it indicates that the network device fails to be authenticated. This is not limited in this application.

Step S309: The network device receives an authentication response message sent by the terminal device.

The authentication response message includes a first authentication parameter (the first authentication parameter is a response (RES) in the prior art). The RES is generated based on the symmetric key K on the terminal device side and the first RAND. The symmetric key on the terminal device side is a symmetric key between the network device and the terminal device. The RES may be generated by using the AKA algorithm provided in the prior art, which is not limited in this application.

Step S310: The network device generates a second authentication parameter based on the symmetric key on the network device side and the first random number.

The second authentication parameter is an expected response (XRES) in the prior art. The XRES may be generated by using the AKA algorithm provided in the prior art, which is not limited in this application.

Step S311: The network device authenticates the terminal device based on the RES and the XRES.

When the RES and the XRES are the same, it indicates that the terminal device can be authenticated; otherwise, it indicates that the terminal device fails to be authenticated.

It should be noted that step S310 and step S305 may be combined into one step for execution.

This application provides a network authentication method. A difference between the network authentication method and a network authentication process in the existing EPS-AKA agreement lies in that: In this application, the network device generates the symmetric key K by itself, and in addition, generates the correct SQN of the terminal device in real time by using the first SQN. In other words, in this application, the network device does not need to store the symmetric key K and the correct SQN of the terminal device, but generates the symmetric key K and the correct SQN of the terminal device in real time. Therefore, storage load of an HSS in the prior art can be reduced, and because a device such as an MME is not required to perform network authentication between the terminal device and the network device in this application, a network authentication chain can be shortened, and network authentication efficiency can be improved.

Further, for how the terminal device determines the symmetric key K on the terminal device side, this application provides the following optional manner:

The terminal device obtains the ID of the network device, and then generates the symmetric key K based on the ID of the network device and the private key of the terminal device according to the IBC mechanism. The private key of the terminal device is generated by the PKG based on the ID of the terminal device and the master private key of the PKG In this embodiment of this application, the ID of the network device may be a MAC address, an IP address, a uniform resource locator (URL) address, a disclosed email address, a postal address, a registered entity name, or the like of the network device.

When the terminal device is always within an authentication range of the same network device, the terminal device may store the symmetric key K. Subsequently, when the terminal device needs to use the symmetric key K, the terminal device may directly obtain the symmetric key K from storage space for use.

Optionally, a manner in which the terminal device obtains the ID of the network device includes: The ID of the network device is the second random number; or the identity of the network device is carried in the AMF parameter; or the network device sends a message to the terminal device, where the message includes the ID of the network device. For example, when the network device is an access network device, the network device sends a broadcast message, where the broadcast message includes the ID of the network device, so that the terminal device generates the symmetric key on the terminal device side based on the ID of the network device and the private key of the terminal device.

Specifically, the network authentication process is described by using an example with reference to the foregoing optional manner.

Figure 4A:
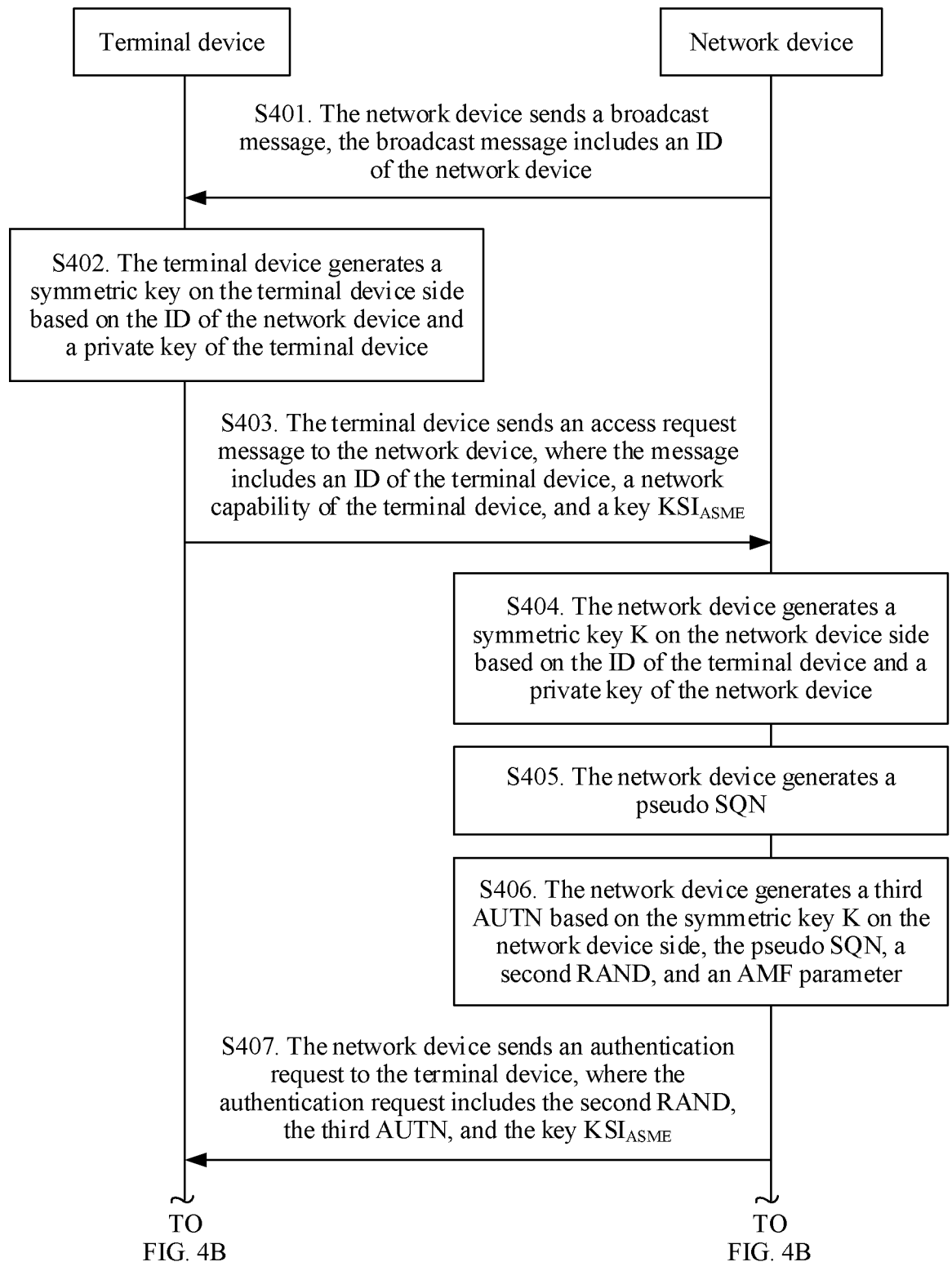
FIG. 4A to FIG. 4C are an interaction flowchart of a network authentication method according to another embodiment of this application.
Figure 4B:
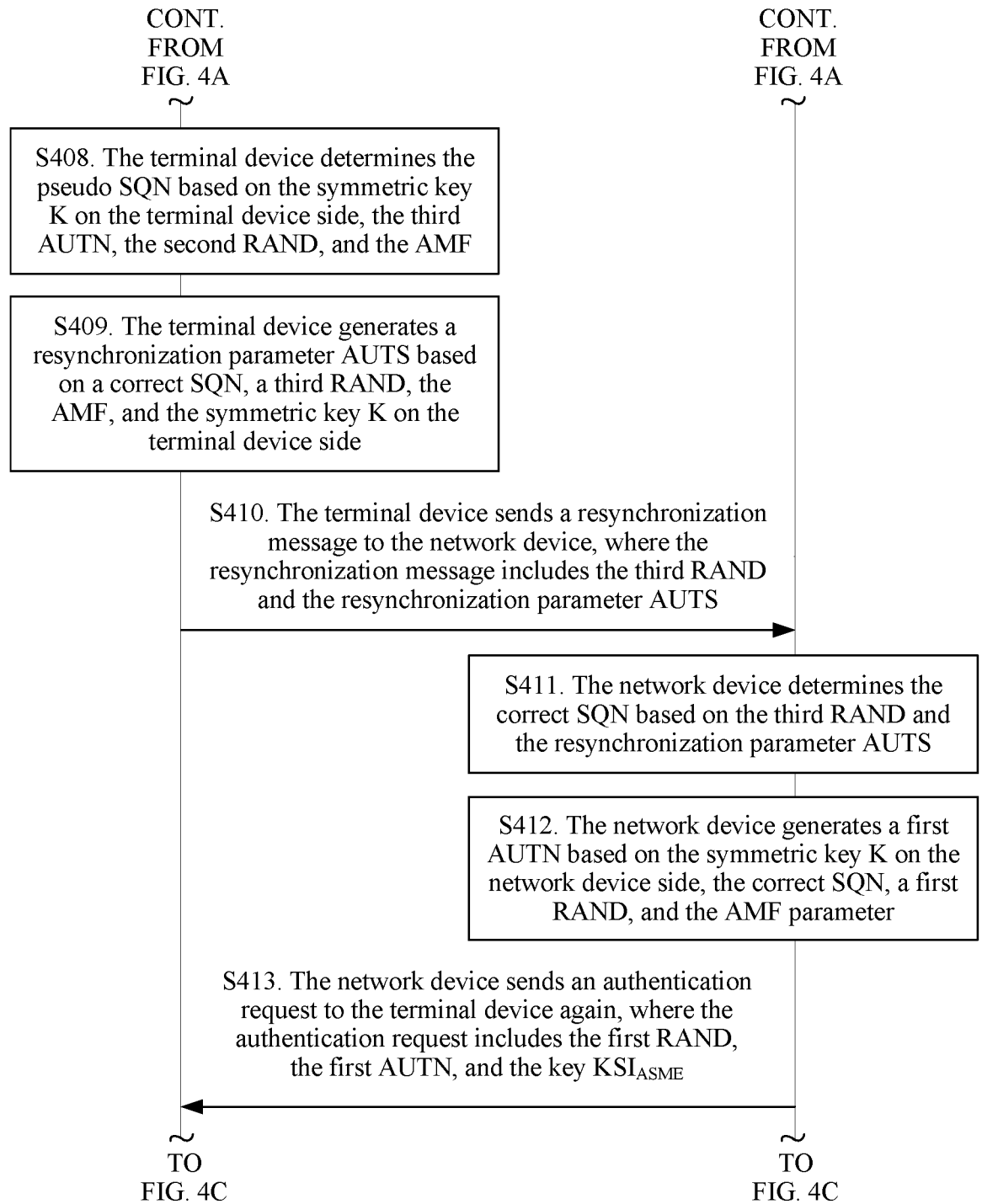
Figure 4C:
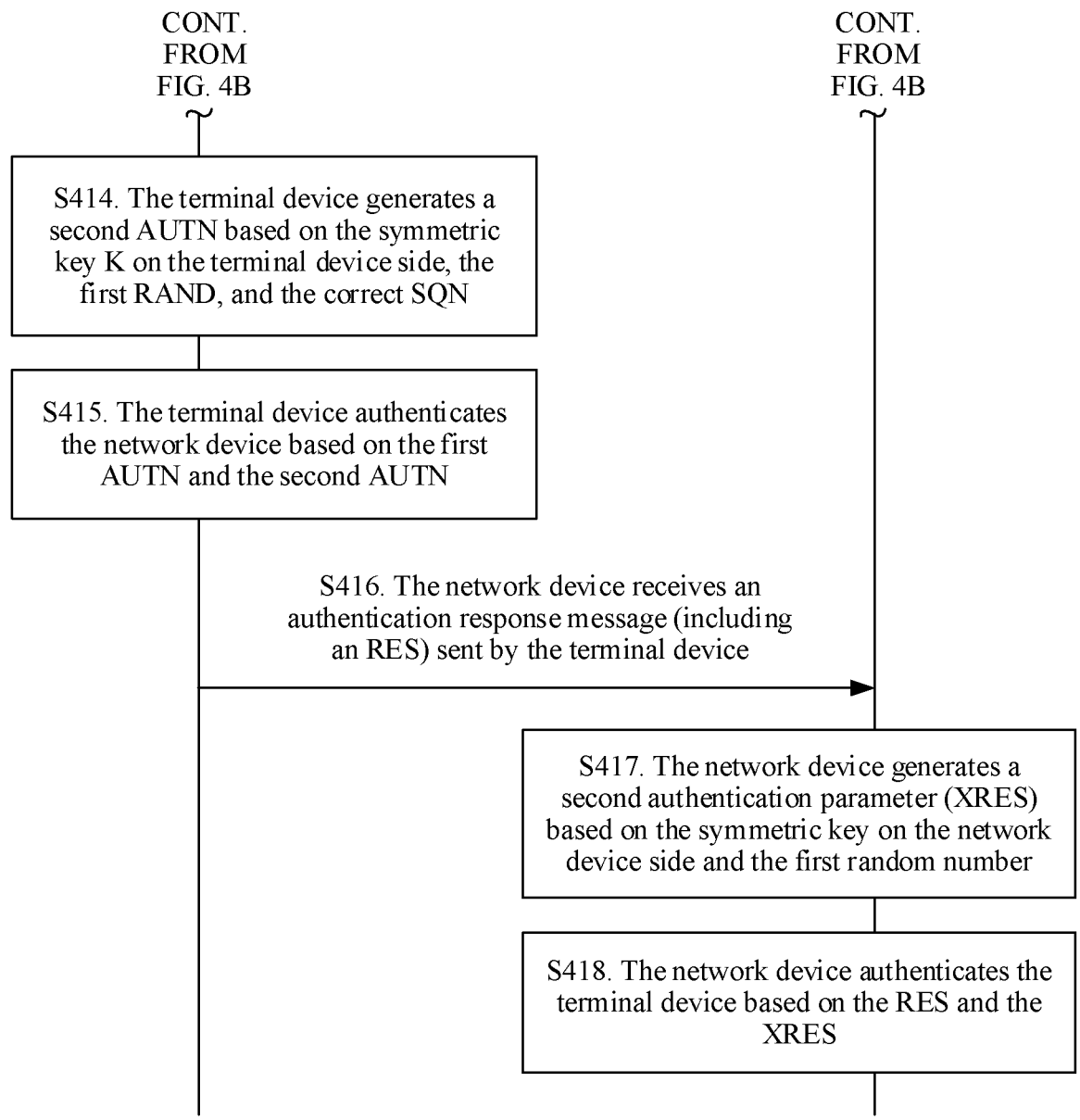

It is assumed that a network device that performs network authentication is a base station or an access point (AP) in an access network (AN), or another device in an AN. A terminal device generates a symmetric key on the terminal device side based on an ID of the network device and a private key of the terminal device. The network device generates a symmetric key on the network device side based on an ID of the terminal device and a private key of the network device. The network device determines a correct SQN of the terminal device based on a pseudo SQN. Specifically, FIG. 4A to FIG. 4C are an interaction flowchart of a network authentication method according to another embodiment of this application. As shown in FIG. 4A to FIG. 4C, the method includes the following steps.

Step S401: The network device sends a broadcast message, where the broadcast message includes the ID of the network device.

Step S402: The terminal device generates the symmetric key on the terminal device side based on the ID of the network device and the private key of the terminal device.

Step S403: The terminal device sends an access request message to the network device, where the message includes the ID of the terminal device, a network capability of the terminal device, and a key $KSI_{ASME}$.

Both the network capability of the terminal device and the key $KSI_{ASME}$ are parameters in an existing EPS-AKA authentication protocol. Meanings of the network capability of the terminal device and the key $KSI_{ASME}$ are the same as those in the EPS-AKA authentication protocol. Details are not described herein again. It should be noted that the key $KSI_{ASME}$ is generated based on the symmetric key K, and is used to generate a subsequent session key.

Step S404: The network device generates the symmetric key K on the network device side based on the ID of the terminal device and the private key of the network device.

Step S405: The network device generates the pseudo SQN.

The pseudo SQN may be a fixed string of digits, or may be a randomly generated string of digits, and a requirement is that a sequence number format and a length requirement in the EPS-AKA are met.

Step S406: The network device generates a third AUTN based on the symmetric key K on the network device side, the pseudo SQN, a second RAND, and an AMF parameter.

Step S407: The network device sends an authentication request to the terminal device, where the authentication request includes the second RAND, the third AUTN, and the key $KSI_{ASME}$.

Step S408: The terminal device determines the pseudo SQN based on the symmetric key K on the terminal device side, the third AUTN, the second RAND, and the AMF.

Step S409: The terminal device generates a resynchronization parameter AUTS based on the correct SQN, a third RAND, the AMF, and the symmetric key K on the terminal device side.

Step S410: The terminal device sends a resynchronization message to the network device, where the resynchronization message includes the third RAND and the resynchronization parameter AUTS.

Step S411: The network device determines the correct SQN based on the third RAND and the resynchronization parameter AUTS.

Step S412: The network device generates a first AUTN based on the symmetric key K on the network device side, the correct SQN, the first RAND, and the AMF parameter.

Step S413: The network device sends an authentication request to the terminal device again, where the authentication request includes the first RAND, the first AUTN, and the key $KSI_{ASME}$.

Step S414: The terminal device generates a second AUTN based on the symmetric key K on the terminal device side, the first RAND, and the correct SQN.

Step S415: The terminal device authenticates the network device based on the first AUTN and the second AUTN.

Step S416: The network device receives an authentication response message sent by the terminal device, where the authentication response message includes a RES.

Step S417: The network device generates an XRES based on the symmetric key on the network device side and the first random number.

Step S418: The network device authenticates the terminal device based on the RES and the XRES.

Steps in the embodiment corresponding to FIG. 4A to FIG. 4C that are the same as those in the embodiment corresponding to FIG. 3A and FIG. 3B are not described in detail herein again.

It should be noted that step S417 and step S412 may be combined into one step for execution.

This application provides a network authentication method. The network device generates the symmetric key K based on the ID of the terminal device and the private key of the network device, and in addition, generates the correct SQN of the terminal device in real time by using the pseudo SQN. In other words, in this application, the network device does not need to store the symmetric key K and the correct SQN of the terminal device, but generates the symmetric key K and the correct SQN of the terminal device in real time. Therefore, storage load of an HSS in the prior art can be reduced, and because a device such as an MME is not required to perform network authentication between the terminal device and the network device in this application, a network authentication chain can be shortened, and network authentication efficiency can be improved.

Figure 5A:
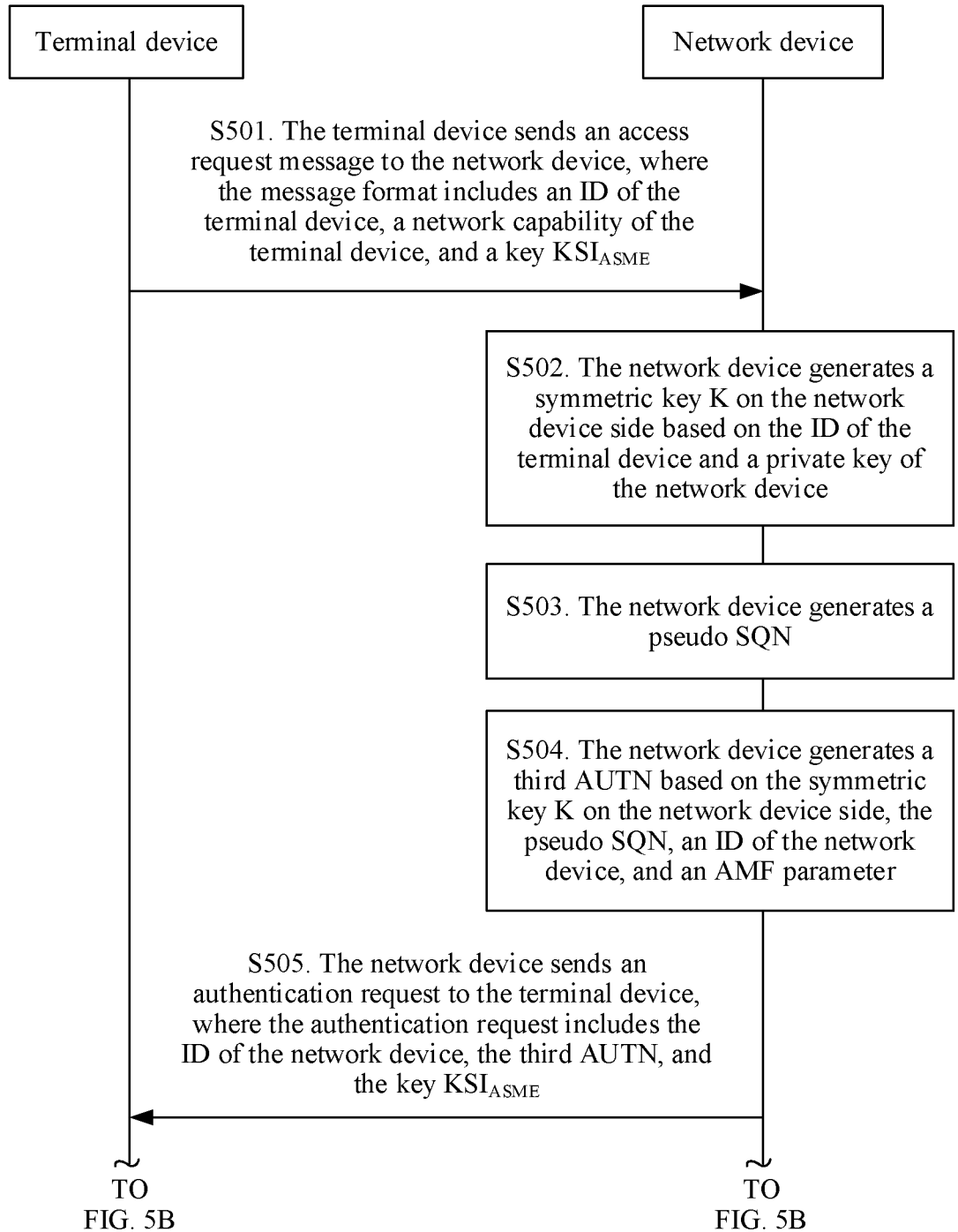
FIG. 5A to FIG. 5C are an interaction flowchart of a network authentication method according to still another embodiment of this application.
Figure 5B:
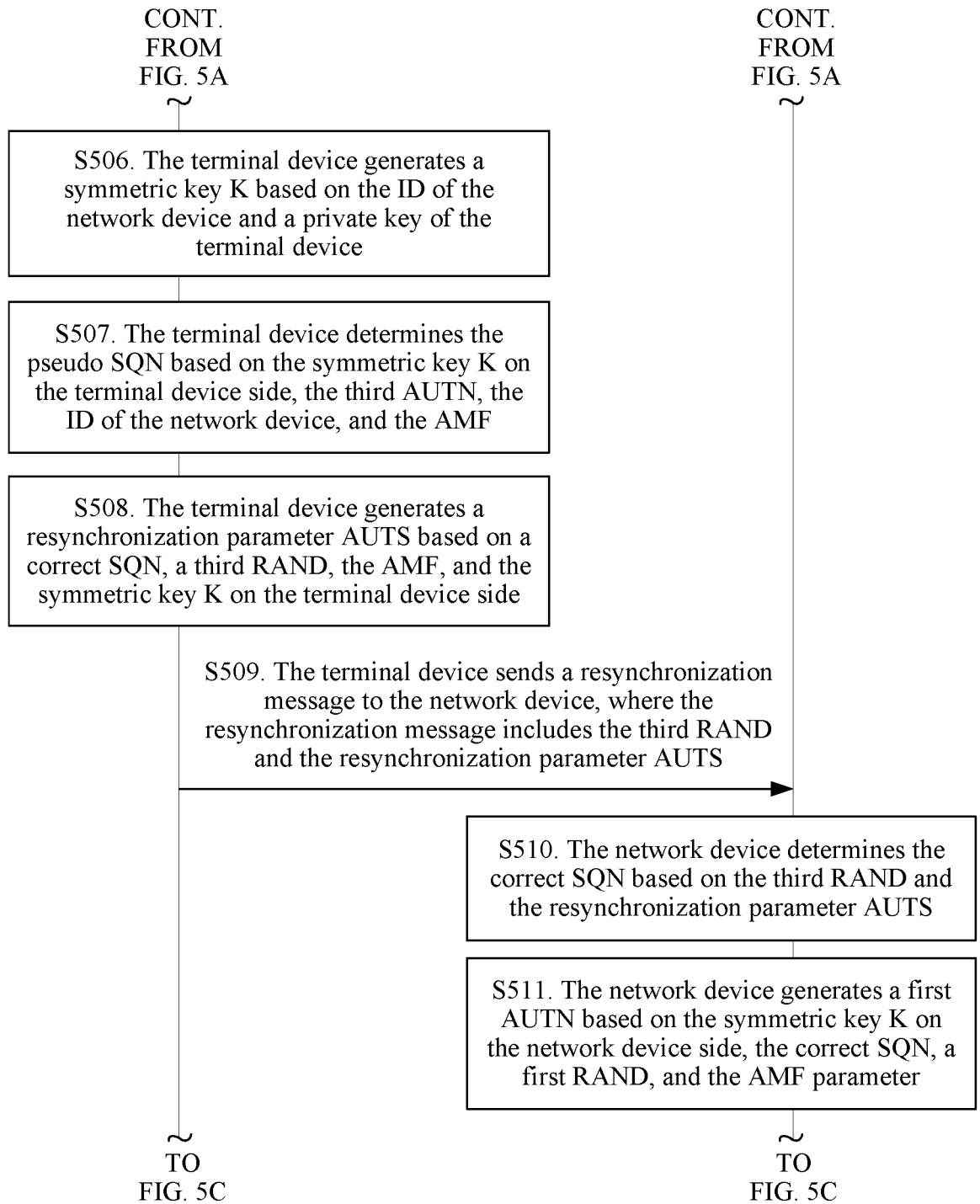
Figure 5C:
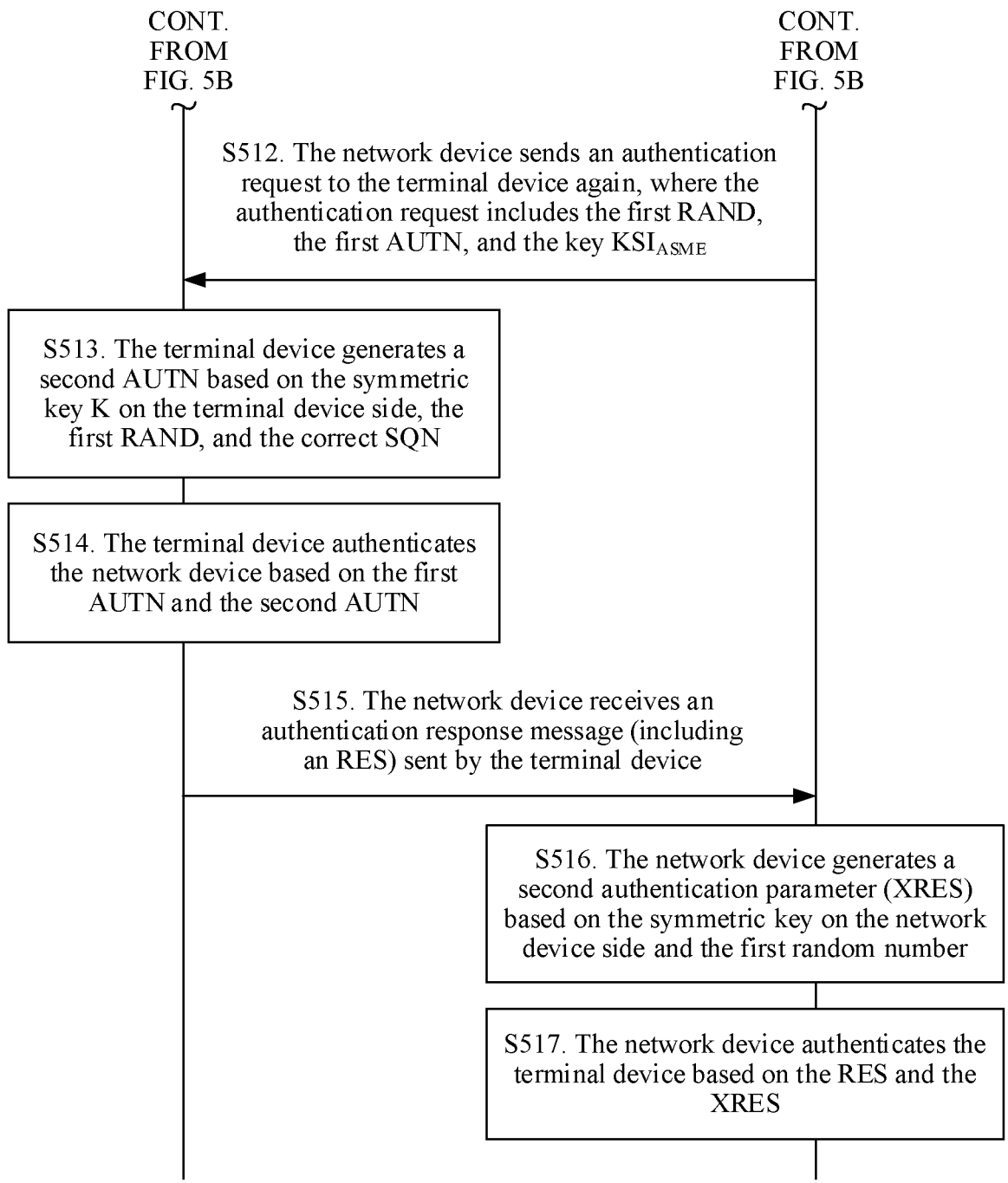

It is assumed that a network device that performs network authentication is a core network device, for example, may be an MME or an AUSF. A terminal device generates a symmetric key on the terminal device side based on an ID of the network device and a private key of the terminal device. The ID of the network device is a second random number. The network device generates a symmetric key on the network device side based on an ID of the terminal device and a private key of the network device. The network device determines a correct SQN of the terminal device based on a pseudo SQN. Specifically, FIG. 5A to FIG. 5C are an interaction flowchart of a network authentication method according to still another embodiment of this application. As shown in FIG. 5A to FIG. 5C, the method includes the following steps.

Step S501: The terminal device sends an access request message to the network device, where the message format includes the ID of the terminal device, a network capability of the terminal device, and a key $KSI_{ASME}$.

Both the network capability of the terminal device and the key $KSI_{ASME}$ are parameters in an existing EPS-AKA authentication protocol. Meanings of the network capability of the terminal device and the key $KSI_{ASME}$ are the same as those in the EPS-AKA authentication protocol. Details are not described herein again. It should be noted that the key $KSI_{ASME}$ is generated based on the symmetric key K, and is used to generate a subsequent session key.

Step S502: The network device generates the symmetric key K on the network device side based on the ID of the terminal device and the private key of the network device.

Step S503: The network device generates the pseudo SQN.

The pseudo SQN may be a fixed string of digits, or may be a randomly generated string of digits, and a requirement is that a sequence number format and a length requirement in the EPS-AKA are met.

Step S504: The network device generates a third AUTN based on the symmetric key K on the network device side, the pseudo SQN, the ID of the network device, and an AMF parameter.

Herein, the ID of the network device replaces the second random number. In other words, the ID of the network device may be sent to the terminal device in this manner.

Step S505: The network device sends an authentication request to the terminal device, where the authentication request includes the ID of the network device, the third AUTN, and the key $KSI_{ASME}$.

Step S506: The terminal device generates a symmetric key K based on the ID of the network device and a private key of the terminal device.

Step S507: The terminal device determines the pseudo SQN based on the symmetric key K on the terminal device side, the third AUTN, the ID of the network device, and the AMF.

Step S508: The terminal device generates a resynchronization parameter AUTS based on the correct SQN, a third RAND, the AMF, and the symmetric key K on the terminal device side.

Step S509: The terminal device sends a resynchronization message to the network device, where the resynchronization message includes the third RAND and the resynchronization parameter AUTS.

Step S510: The network device determines the correct SQN based on the third RAND and the resynchronization parameter AUTS.

Step S511: The network device generates a first AUTN based on the symmetric key K on the network device side, the correct SQN, a first RAND, and the AMF parameter.

Step S512: The network device sends an authentication request to the terminal device again, where the authentication request includes the first RAND, the first AUTN, and the key $KSI_{ASME}$.

Step S513: The terminal device generates a second AUTN based on the symmetric key K on the terminal device side, the first RAND, and the correct SQN.

Step S514: The terminal device authenticates the network device based on the first AUTN and the second AUTN.

Step S515: The network device receives an authentication response message sent by the terminal device, where the authentication response message includes a RES.

Step S516: The network device generates an XRES based on the symmetric key on the network device side and the first random number.

Step S517: The network device authenticates the terminal device based on the RES and the XRES.

Steps in the embodiment corresponding to FIG. 5A to FIG. 5C that are the same as those in the embodiment corresponding to FIG. 3A and FIG. 3B are not described in detail herein again.

It should be noted that step S516 and step S511 may be combined into one step for execution.

This embodiment of this application differs from the embodiment corresponding to FIG. 5A to FIG. 5C in that, in this application, the ID of the network device replaces the second random number, and the ID of the network device is transmitted by using this method, so as to reduce network overheads.

Figure 6A:
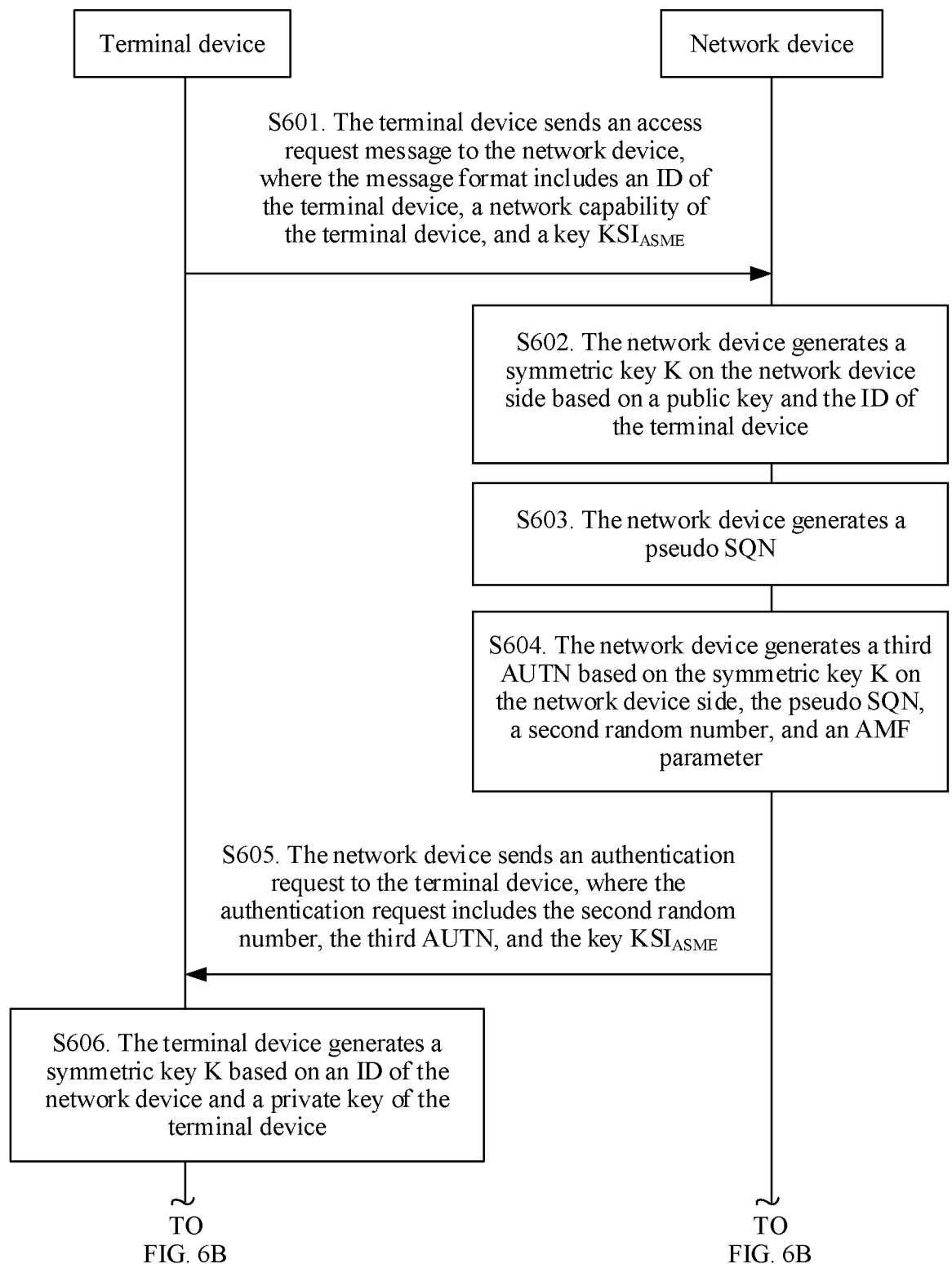
FIG. 6A to FIG. 6C are an interaction flowchart of a network authentication method according to yet another embodiment of this application.
Figure 6B:
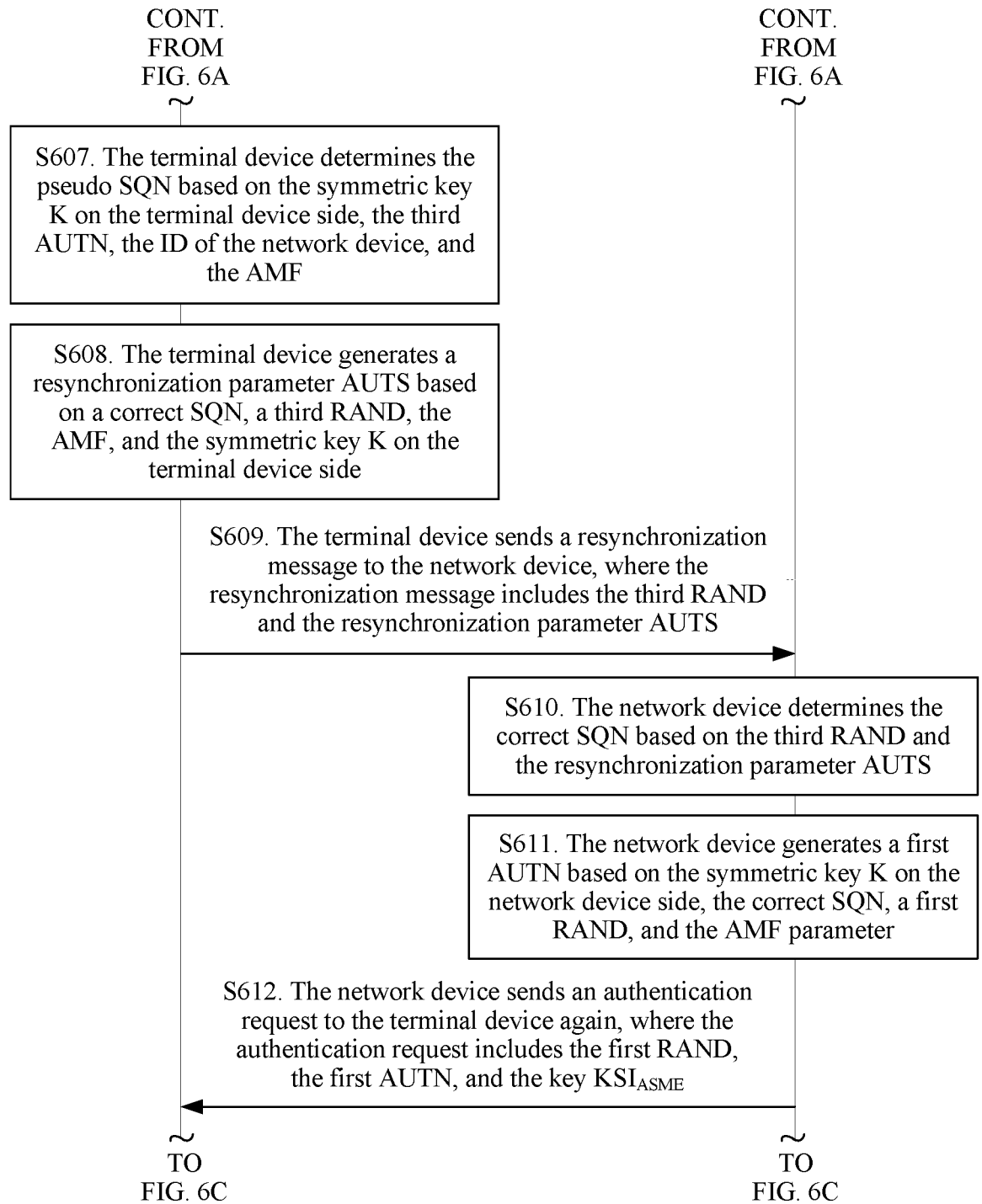
Figure 6C:
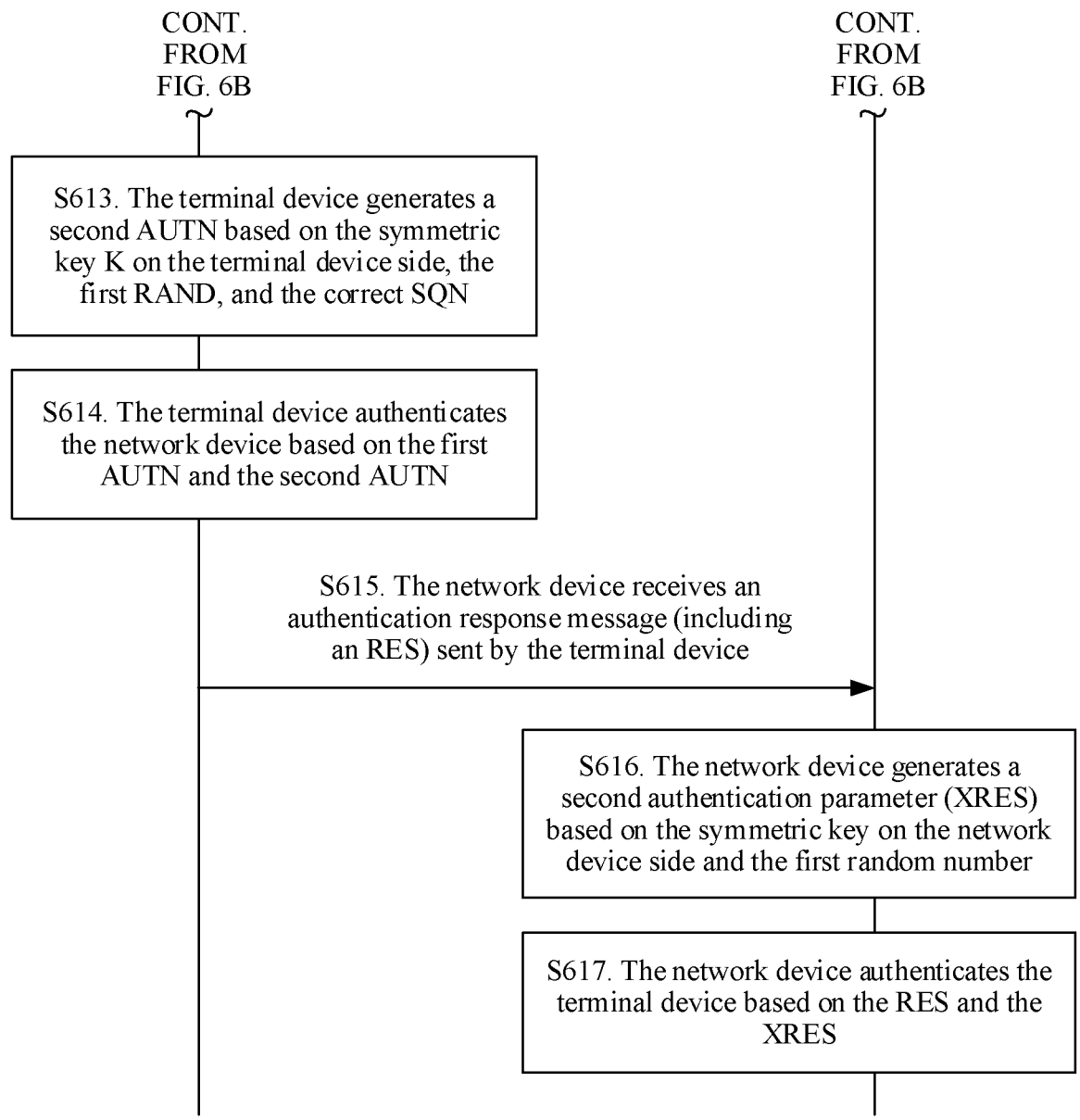

It is assumed that a terminal device is always within an authentication range of a same network device, the terminal device has stored a symmetric key K on the terminal device side, and the network device derives a symmetric key K on the network device side based on a public key corresponding to a plurality of terminal devices including the terminal device and an ID of the terminal device. Specifically, FIG. 6A to FIG. 6C are an interaction flowchart of a network authentication method according to yet another embodiment of this application. As shown in FIG. 6A to FIG. 6C, the method includes the following steps.

Step S601: The terminal device sends an access request message to the network device, where the message format includes the ID of the terminal device, a network capability of the terminal device, and a key $KSI_{ASME}$.

Both the network capability of the terminal device and the key $KSI_{ASME}$ are parameters in an existing EPS-AKA authentication protocol. Meanings of the network capability of the terminal device and the key $KSI_{ASME}$ are the same as those in the EPS-AKA authentication protocol. Details are not described herein again. It should be noted that the key $KSI_{ASME}$ is generated based on the symmetric key K, and is used to generate a subsequent session key.

Step S602: The network device generates the symmetric key K on the network device side based on the public key and the ID of the terminal device.

Step S603: The network device generates a pseudo SQN.

The pseudo SQN may be a fixed string of digits, or may be a randomly generated string of digits, and a requirement is that a sequence number format and a length requirement in the EPS-AKA are met.

Step S604: The network device generates a third AUTN based on the symmetric key K on the network device side, the pseudo SQN, a second random number, and an AMF parameter.

Step S605: The network device sends an authentication request to the terminal device, where the authentication request includes the second random number, the third AUTN, and the key $KSI_{ASME}$.

Step S606: The terminal device generates the symmetric key K based on an ID of the network device and a private key of the terminal device.

Step S607: The terminal device determines the pseudo SQN based on the symmetric key K on the terminal device side, the third AUTN, the ID of the network device, and the AMF.

Step S608: The terminal device generates a resynchronization parameter AUTS based on a correct SQN, a third RAND, the AMF, and the symmetric key K on the terminal device side.

Step S609: The terminal device sends a resynchronization message to the network device, where the resynchronization message includes the third RAND and the resynchronization parameter AUTS.

Step S610: The network device determines the correct SQN based on the third RAND and the resynchronization parameter AUTS.

Step S611: The network device generates a first AUTN based on the symmetric key K on the network device side, the correct SQN, the first RAND, and the AMF parameter.

Step S612: The network device sends an authentication request to the terminal device, where the authentication request includes the first RAND, the first AUTN, and the key $KSI_{ASME}$.

Step S613: The terminal device generates a second AUTN based on the symmetric key K on the terminal device side, the first RAND, and the correct SQN.

Step S614: The terminal device authenticates the network device based on the first AUTN and the second AUTN.

Step S615: The network device receives an authentication response message sent by the terminal device, where the authentication response message includes a RES.

Step S616: The network device generates an XRES based on the symmetric key K on the network device side and the first random number.

Step S617: The network device authenticates the terminal device based on the RES and the XRES.

Steps in the embodiment corresponding to FIG. 6A to FIG. 6C that are the same as those in the embodiment corresponding to FIG. 3A and FIG. 3B are not described in detail herein again.

It should be noted that step S616 and step S611 may be combined into one step for execution.

This embodiment of this application differs from the foregoing embodiments in that the network device in this application may generate the symmetric key on the network device side by using the public key and the ID of the terminal device. In other words, in this application, the network device does not need to store the symmetric key K and the correct SQN of the terminal device, but generates the symmetric key K in real time, so that storage load of an HSS in the prior art can be reduced.

Figure 7A:
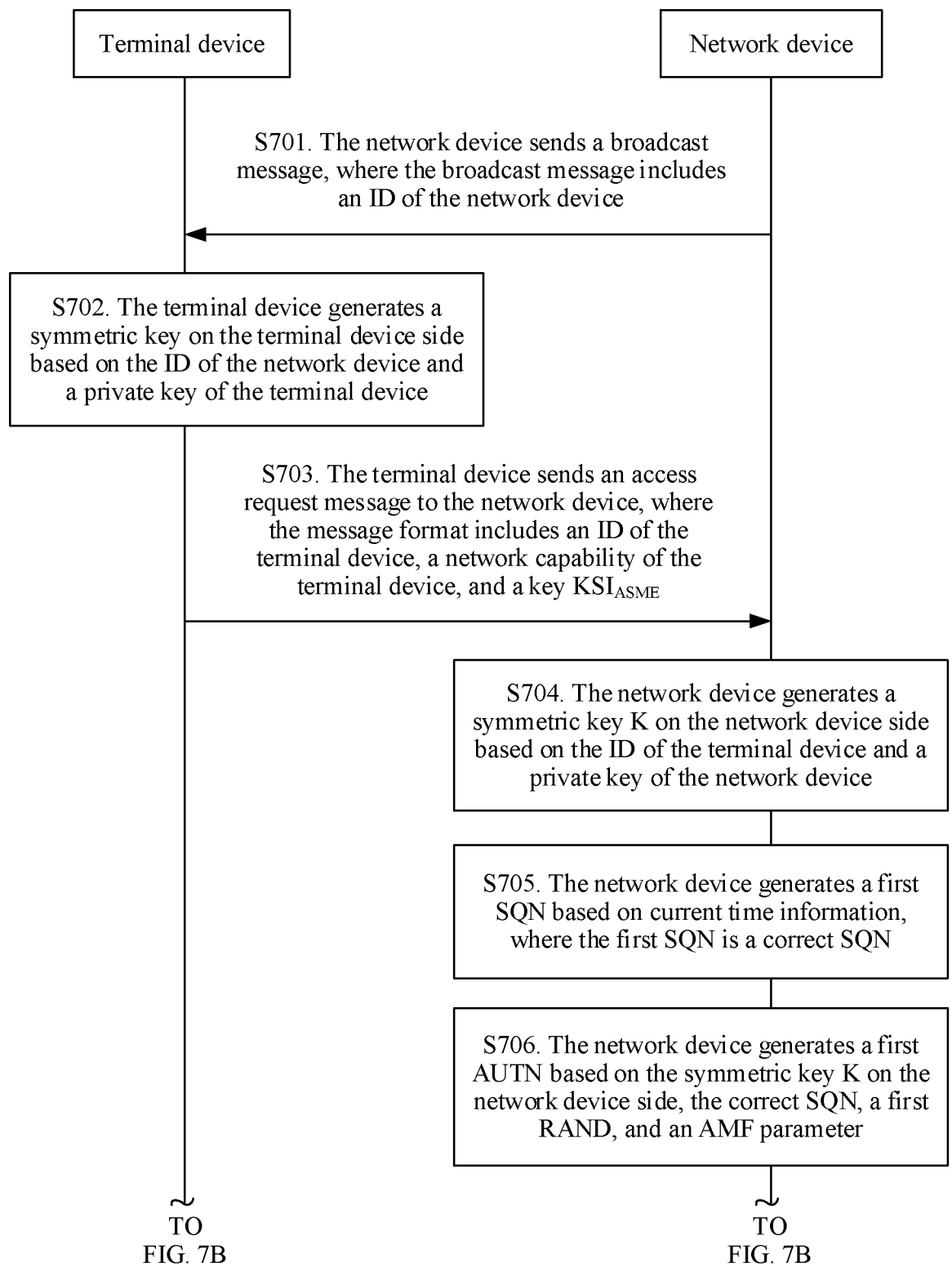
FIG. 7A and FIG. 7B are an interaction flowchart of a network authentication method according to still another embodiment of this application.
Figure 7B:
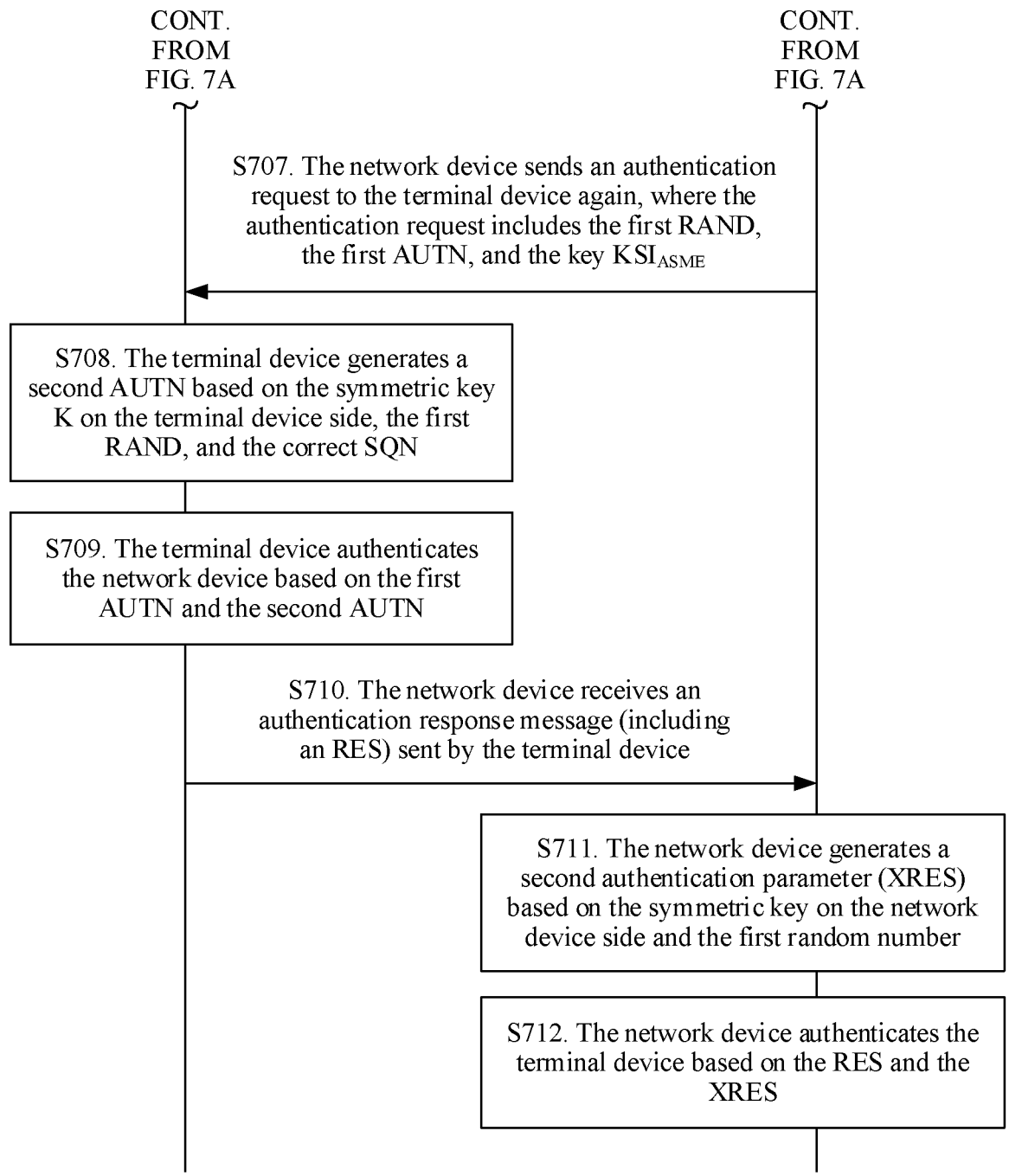

It is assumed that a network device that performs network authentication is a base station or an access point (AP) in an access network (AN), or another device in an AN. A terminal device generates a symmetric key on the terminal device side based on an ID of the network device and a private key of the terminal device. The network device generates a symmetric key on the network device side based on an ID of the terminal device and a private key of the network device. The network device generates a first SQN, where the first SQN is an SQN generated based on current time information, that is, the SQN is a correct SQN of the terminal device. Specifically, FIG. 7A and FIG. 7B are an interaction flowchart of a network authentication method according to still another embodiment of this application. As shown in FIG. 7A and FIG. 7B, the method includes the following steps.

Step S701: The network device sends a broadcast message, where the broadcast message includes the ID of the network device.

Step S702: The terminal device generates the symmetric key on the terminal device side based on the ID of the network device and the private key of the terminal device.

Step S703: The terminal device sends an access request message to the network device, where the message format includes the ID of the terminal device, a network capability of the terminal device, and a key $KSI_{ASME}$.

Both the network capability of the terminal device and the key $KSI_{ASME}$ are parameters in an existing EPS-AKA authentication protocol. Meanings of the network capability of the terminal device and the key $KSI_{ASME}$ are the same as those in the EPS-AKA authentication protocol. Details are not described herein again. It should be noted that the key $KSI_{ASME}$ is generated based on the symmetric key K, and is used to generate a subsequent session key.

Step S704: The network device generates the symmetric key K on the network device side based on the ID of the terminal device and the private key of the network device.

Step S705: The network device generates the first SQN based on the current time information, where the first SQN is the correct SQN.

Step S706: The network device generates a first AUTN based on the symmetric key K on the network device side, the correct SQN, a first RAND, and the AMF parameter.

Step S707: The network device sends an authentication request to the terminal device, where the authentication request includes the first RAND, the first AUTN, and the key $KSI_{ASME}$.

Step S708: The terminal device generates a second AUTN based on the symmetric key K on the terminal device side, the first RAND, and the correct SQN.

Step S709: The terminal device authenticates the network device based on the first AUTN and the second AUTN.

Step S710: The network device receives an authentication response sent by the terminal device, where the authentication response message includes a RES.

Step S711: The network device generates an XRES based on the symmetric key on the network device side and the first random number.

Step S712: The network device authenticates the terminal device based on the RES and the XRES.

Steps in the embodiment corresponding to FIG. 7A and FIG. 7B that are the same as those in the embodiment corresponding to FIG. 3A and FIG. 3B are not described in detail herein again.

It should be noted that step S711 and step S706 may be combined into one step for execution.

This application provides a network authentication method. The network device generates the symmetric key K based on the ID of the terminal device and the private key of the network device, and in addition, generates the first SQN based on the current time information, where the first SQN is the correct SQN of the terminal device. In other words, in this application, the network device does not need to store the symmetric key K and the correct SQN of the terminal device, but generates the symmetric key K and the correct SQN of the terminal device in real time. Therefore, storage load of an HSS in the prior art can be reduced, and because a device such as an MME is not required to perform network authentication between the terminal device and the network device in this application, a network authentication chain can be shortened, and network authentication efficiency can be improved.

Figure 8A:
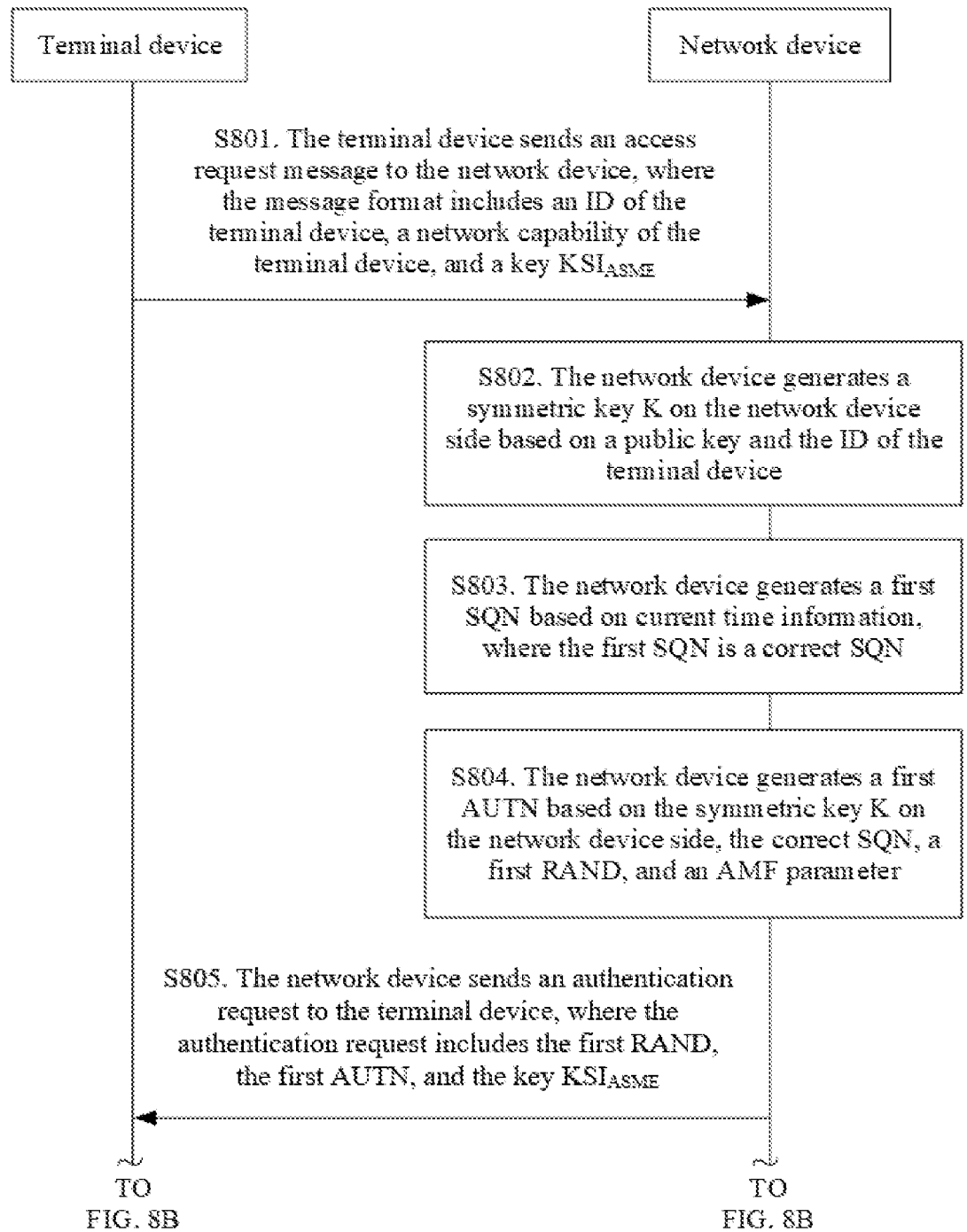
FIG. 8A and FIG. 8B are an interaction flowchart of a network authentication method according to still another embodiment of this application.
Figure 8B:
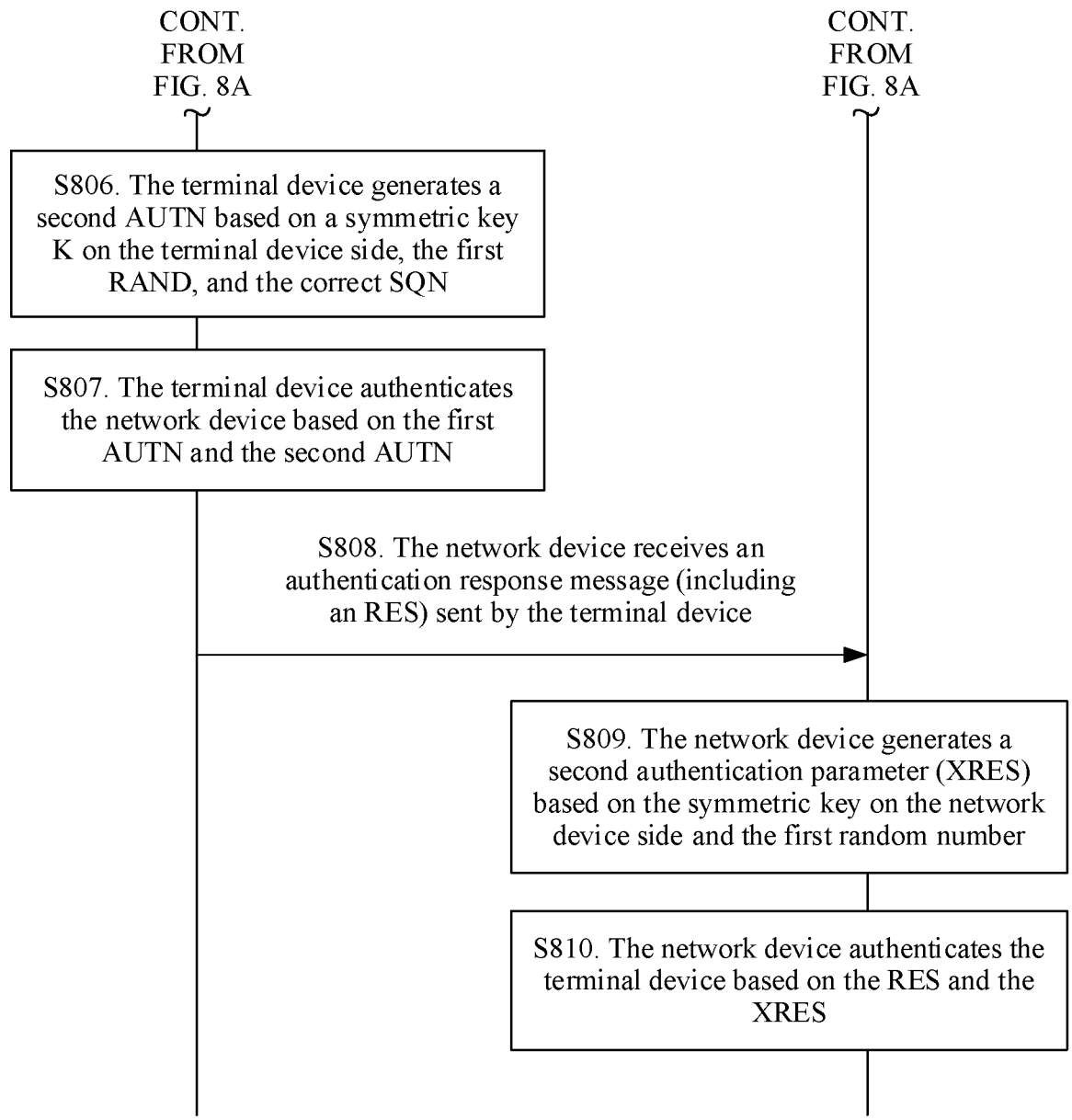

It is assumed that a terminal device is always within an authentication range of a same network device, the terminal device has stored a symmetric key K on the terminal device side, and the network device derives a symmetric key K on the network device side based on a public key corresponding to a plurality of terminal devices including the terminal device and an ID of the terminal device. In addition, the network device generates a first SQN, where the first SQN is an SQN generated based on current time information, that is, the SQN is a correct SQN of the terminal device. Specifically, FIG. 8A and FIG. 8B are an interaction flowchart of a network authentication method according to still another embodiment of this application. As shown in FIG. 8A and FIG. 8B, the method includes the following steps.

Step S801: The terminal device sends an access request message to the network device, where the message format includes the ID of the terminal device, a network capability of the terminal device, and a key $KSI_{ASME}$.

Both the network capability of the terminal device and the key $KSI_{ASME}$ are parameters in an existing EPS-AKA authentication protocol. Meanings of the network capability of the terminal device and the key $KSI_{ASME}$ are the same as those in the EPS-AKA authentication protocol. Details are not described herein again. It should be noted that the key $KSI_{ASME}$ is generated based on the symmetric key K, and is used to generate a subsequent session key.

Step S802: The network device generates the symmetric key K on the network device side based on the public key and the ID of the terminal device.

Step S803: The network device generates the first SQN based on the current time information, where the first SQN is the correct SQN.

Step S804: The network device generates a first AUTN based on the symmetric key K on the network device side, the correct SQN, a first RAND, and an AMF parameter.

Step S805: The network device sends an authentication request to the terminal device, where the authentication request includes the first RAND, the first AUTN, and the key $KSI_{ASME}$.

Step S806: The terminal device generates a second AUTN based on the symmetric key K on the terminal device side, the first RAND, and the correct SQN.

Step S807: The terminal device authenticates the network device based on the first AUTN and the second AUTN.

Step S808: The network device receives an authentication response message sent by the terminal device, where the authentication response message includes a RES.

Step S809: The network device generates an XRES based on the symmetric key on the network device side and the first random number.

Step S810: The network device authenticates the terminal device based on the RES and the XRES.

Steps in the embodiment corresponding to FIG. 8A and FIG. 8B that are the same as those in the embodiment corresponding to FIG. 3A and FIG. 3B are not described in detail herein again.

It should be noted that step S809 and step S804 may be combined into one step for execution.

This application provides a network authentication method. The network device generates the symmetric key K based on the private key of the network device and the public key, and in addition, generates the first SQN based on the current time information, where the first SQN is the correct SQN of the terminal device. In other words, in this application, the network device does not need to store the symmetric key K and the correct SQN of the terminal device, but generates the symmetric key K and the correct SQN of the terminal device in real time. Therefore, storage load of an HSS in the prior art can be reduced, and because a device such as an MME is not required to perform network authentication between the terminal device and the network device in this application, a network authentication chain can be shortened, and network authentication efficiency can be improved.

Figure 9:
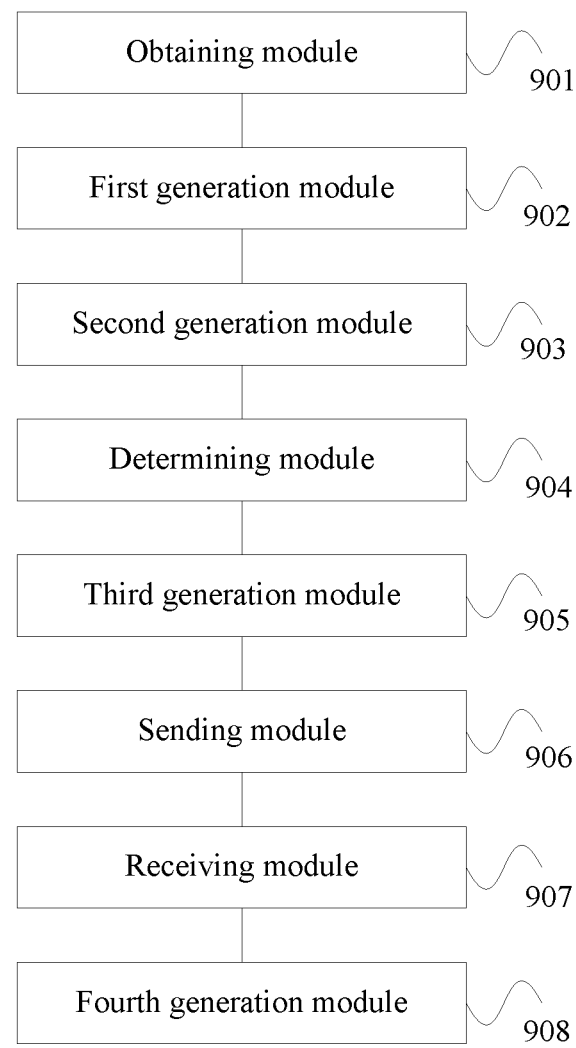
FIG. 9 is a schematic structural diagram of a network authentication apparatus according to an embodiment of this application.

FIG. 9 is a schematic structural diagram of a network authentication apparatus according to an embodiment of this application. As shown in FIG. 9, the apparatus includes an obtaining module 901, a first generation module 902, a second generation module 903, a determining module 904, a third generation module 905, a sending module 906, a receiving module 907, and a fourth generation module 908.

The obtaining module 901 is configured to obtain an identity of a terminal device. The first generation module 902 is configured to generate a symmetric key on a network device side based on the identity of the terminal device and a first key of the network device. The second generation module 903 is configured to generate a first sequence number for the terminal device. The determining module 904 is configured to determine a correct sequence number of the terminal device based on the first sequence number. The third generation module 905 is configured to generate a first authentication token based on the symmetric key on the network device side, the correct sequence number, a first random number, and an authentication management field parameter configured by the network device for the terminal device, where the authentication management field parameter is used to limit parameters involved in the network authentication process of the terminal device. The sending module 906 is configured to send the first random number and the first authentication token to the terminal device, so that the terminal device authenticates the network device based on the first authentication token and a second authentication token, where the second authentication token is generated by the terminal device based on a symmetric key on the terminal device side, the first random number, the correct sequence number, and the authentication management field parameter. The receiving module 907 is configured to receive an authentication response message sent by the terminal device, where the authentication response message includes a first authentication parameter, and the first authentication parameter is generated based on the first random number and the symmetric key on the terminal device side. The fourth generation module 908 is configured to generate a second authentication parameter based on the symmetric key on the network device side and the first random number; and authenticate the terminal device based on the first authentication parameter and the second authentication parameter.

Optionally, the first key is a private key of the network device, or the first key is a public key corresponding to a plurality of terminal devices that include the terminal device.

Optionally, the first sequence number is a sequence number generated by the network device based on current time information, and the first sequence number is the same as the correct sequence number.

Optionally, the first sequence number is a pseudo sequence number of the terminal device. Correspondingly, the determining module 904 is specifically configured to generate a third authentication token based on the symmetric key on the network device side, the pseudo sequence number, a second random number, and the authentication management field parameter. The sending module 906 is further configured to send the second random number and the third authentication token, so that the terminal device determines the pseudo sequence number based on the symmetric key on the terminal device side, the third authentication token, the second random number, and the authentication management field parameter. The receiving module 907 is further configured to receive a resynchronization message sent by the terminal device, where the resynchronization message includes a resynchronization parameter and a third random number. The determining module 904 is specifically configured to determine the correct sequence number based on the resynchronization parameter and the third random number.

Optionally, an identity of the network device is the second random number, or an identity of the network device is carried in the authentication management field parameter, so that the terminal device generates the symmetric key on the terminal device side based on the identity of the network device and a private key of the terminal device.

Optionally, when the network device is an access network device, the sending module 906 is further configured to send a broadcast message, where the broadcast message includes an identity of the network device, so that the terminal device generates the symmetric key on the terminal device side based on the identity of the network device and a private key of the terminal device.

This application provides a network authentication apparatus, and the network authentication apparatus may be configured to perform the method steps performed by the foregoing network device. Implementation principles and technical effects are similar, and details are not described herein again.

Figure 10:
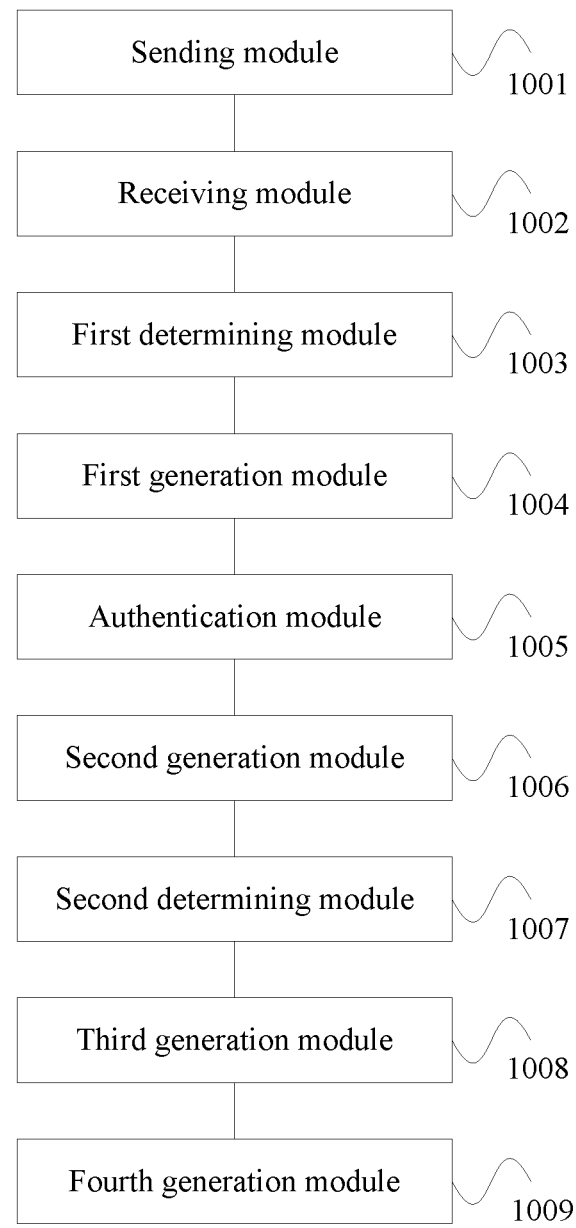
FIG. 10 is a schematic structural diagram of a network authentication apparatus according to another embodiment of this application.

FIG. 10 is a schematic structural diagram of a network authentication apparatus according to another embodiment of this application. As shown in FIG. 10, the apparatus includes a sending module 1001, a receiving module 1002, a first determining module 1003, a first generation module 1004, an authentication module 1005, a second generation module 1006, a second determining module 1007, a third generation module 1008, and a fourth generation module 1009.

The sending module 1001 is configured to send an identity of a terminal device to a network device, so that the network device generates a symmetric key on the network device side based on the identity of the terminal device and a first key of the network device. The receiving module 1002 is configured to receive a first random number and a first authentication token that are sent by the network device, where the first authentication token is generated by the network device based on the symmetric key on the network device side, a correct sequence number of the terminal device, the first random number, and an authentication management field parameter configured by the network device for the terminal device, and the authentication management field parameter is used to limit parameters involved in the network authentication process of the terminal device. The first determining module 1003 is configured to determine the correct sequence number based on the first authentication token, a symmetric key on the terminal device side, the first random number, and the authentication management field parameter. The first generation module 1004 is configured to: generate a second authentication token based on the symmetric key on the terminal device side, the first random number, the correct sequence number, and the authentication management field parameter. The authentication module 1005 is configured to authenticate the network device based on the first authentication token and the second authentication token. The second generation module 1006 is configured to generate a first authentication parameter based on the first random number and the symmetric key on the terminal device side. The sending module 1001 is further configured to send an authentication response message to the network device, where the authentication response message includes the first authentication parameter; and the first authentication parameter is used by the network device to authenticate the terminal device.

Optionally, the first key is a private key of the network device, or the first key is a public key corresponding to a plurality of terminal devices that include the terminal device.

Optionally, the correct sequence number is determined by the network device by using a first sequence number.

Optionally, the first sequence number is a sequence number generated by the network device based on current time information, and the first sequence number is the same as the correct sequence number.

Optionally, the first sequence number is a pseudo sequence number of the terminal device. The receiving module 1002 is further configured to receive a second random number and a third authentication token that are sent by the network device, where the third authentication token is generated by the network device based on the symmetric key on the network device side, the pseudo sequence number, the second random number, and the authentication management field parameter. The second determining module 1007 is configured to determine the pseudo sequence number based on the symmetric key on the terminal device side, the third authentication token, the second random number, and the authentication management field parameter. The third generation module 1008 is configured to generate a resynchronization parameter based on the correct sequence number, a third random number, the authentication management field parameter, and the symmetric key on the terminal device side. The sending module 1001 is further configured to send a resynchronization message to the network device, where the resynchronization message includes the resynchronization parameter and the third random number, so that the network device determines the correct sequence number based on the resynchronization parameter and the third random number.

Optionally, an identity of the network device is the second random number, or an identity of the network device is carried in the authentication management field parameter. The fourth generation module 1009 is configured to generate the symmetric key on the terminal device side based on the identity of the network device and a private key of the terminal device.

Optionally, when the network device is an access network device, the receiving module 1002 is further configured to receive a broadcast message sent by the network device, where the broadcast message includes an identity of the network device. The fourth generation module 1009 is configured to generate the symmetric key on the terminal device side based on the identity of the network device and a private key of the terminal device.

This application provides a network authentication apparatus, and the network authentication apparatus may be configured to perform the method steps performed by the foregoing terminal device. Implementation principles and technical effects are similar, and details are not described herein again.

Figure 11:
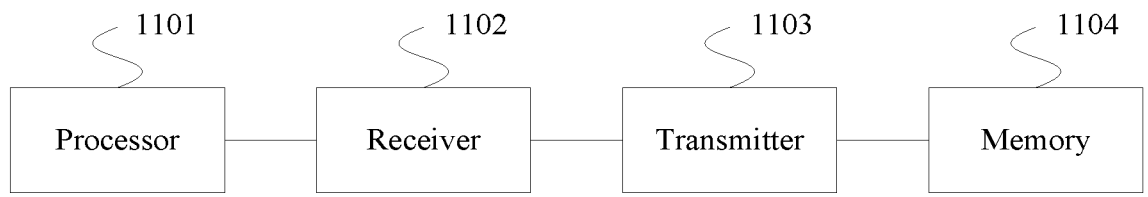
FIG. 11 is a schematic structural diagram of a network device according to an embodiment of this application.

FIG. 11 is a schematic structural diagram of a network device according to an embodiment of this application. As shown in FIG. 11, the network device includes a processor 1101, a receiver 1102, a transmitter 1103, and a memory 1104. The memory 1104 is configured to store code, and when the code is run by the processor 1101, the method embodiment executed by the foregoing network device is implemented. Specifically, the processor 1101 is configured to obtain an identity of a terminal device; generate a symmetric key on the network device side based on the identity of the terminal device and a first key of the network device; generate a first sequence number for the terminal device; determine a correct sequence number of the terminal device based on the first sequence number; and generate a first authentication token based on the symmetric key on the network device side, the correct sequence number, a first random number, and an authentication management field parameter configured by the network device for the terminal device, where the authentication management field parameter is used to limit parameters involved in the network authentication process of the terminal device. The transmitter 1103 is configured to send the first random number and the first authentication token to the terminal device, so that the terminal device authenticates the network device based on the first authentication token and a second authentication token, where the second authentication token is generated by the terminal device based on a symmetric key on the terminal device side, the first random number, the correct sequence number, and the authentication management field parameter. The receiver 1102 is configured to receive an authentication response message sent by the terminal device, where the authentication response message includes a first authentication parameter, and the first authentication parameter is generated based on the first random number and the symmetric key on the terminal device side. The processor 1101 is further configured to: generate a second authentication parameter based on the symmetric key on the network device side and the first random number; and authenticate the terminal device based on the first authentication parameter and the second authentication parameter.

Optionally, the first key is a private key of the network device, or the first key is a public key corresponding to a plurality of terminal devices that include the terminal device.

Optionally, the first sequence number is a sequence number generated by the network device based on current time information, and the first sequence number is the same as the correct sequence number.

Optionally, the first sequence number is a pseudo sequence number of the terminal device. Correspondingly, the processor 1101 is specifically configured to generate a third authentication token based on the symmetric key on the network device side, the pseudo sequence number, a second random number, and the authentication management field parameter. The transmitter 1103 is further configured to send the second random number and the third authentication token, so that the terminal device determines the pseudo sequence number based on the symmetric key on the terminal device side, the third authentication token, the second random number, and the authentication management field parameter. The receiver 1102 is further configured to receive a resynchronization message sent by the terminal device, where the resynchronization message includes a resynchronization parameter and a third random number. The processor 1101 is specifically configured to determine the correct sequence number based on the resynchronization parameter and the third random number.

Optionally, an identity of the network device is the second random number, or an identity of the network device is carried in the authentication management field parameter, so that the terminal device generates the symmetric key on the terminal device side based on the identity of the network device and a private key of the terminal device.

Optionally, when the network device is an access network device, the transmitter 1103 is further configured to send a broadcast message, where the broadcast message includes an identity of the network device, so that the terminal device generates the symmetric key on the terminal device side based on the identity of the network device and a private key of the terminal device.

This application provides a network device, and the network device may be configured to perform the method steps performed by the foregoing network device. Implementation principles and technical effects are similar, and details are not described herein again.

Figure 12:
FIG. 12 is a schematic structural diagram of a terminal device according to another embodiment of this application.

FIG. 12 is a schematic structural diagram of a terminal device according to another embodiment of this application. As shown in FIG. 12, the terminal device includes a transmitter 1201, a receiver 1202, a processor 1203, and a memory 1204. The memory 1204 is configured to store code, and when the code is run by the processor 1203, the method embodiment executed by the foregoing terminal device is implemented. Specifically, the transmitter 1201 is configured to send an identity of a terminal device to a network device, so that the network device generates a symmetric key on the network device side based on the identity of the terminal device and a first key of the network device. The receiver 1202 is configured to receive a first random number and a first authentication token that are sent by the network device, where the first authentication token is generated by the network device based on the symmetric key on the network device side, a correct sequence number of the terminal device, the first random number, and an authentication management field parameter configured by the network device for the terminal device, and the authentication management field parameter is used to limit parameters involved in the network authentication process of the terminal device. The processor 1203 is configured to: determine the correct sequence number based on the first authentication token, a symmetric key on the terminal device side, the first random number, and the authentication management field parameter; generate a second authentication token based on the symmetric key on the terminal device side, the first random number, the correct sequence number, and the authentication management field parameter; authenticate the network device based on the first authentication token and the second authentication token; and generate a first authentication parameter based on the first random number and the symmetric key on the terminal device side. The transmitter 1201 is further configured to send an authentication response message to the network device, where the authentication response message includes the first authentication parameter; and the first authentication parameter is used by the network device to authenticate the terminal device.

Optionally, the first key is a private key of the network device, or the first key is a public key corresponding to a plurality of terminal devices that include the terminal device.

Optionally, the correct sequence number is determined by the network device by using a first sequence number.

Optionally, the first sequence number is a sequence number generated by the network device based on current time information, and the first sequence number is the same as the correct sequence number.

Optionally, the first sequence number is a pseudo sequence number of the terminal device. The receiver 1202 is further configured to receive a second random number and a third authentication token that are sent by the network device, where the third authentication token is generated by the network device based on the symmetric key on the network device side, the pseudo sequence number, the second random number, and the authentication management field parameter. The processor 1203 is further configured to: determine the pseudo sequence number based on the symmetric key on the terminal device side, the third authentication token, the second random number, and the authentication management field parameter; and generate a resynchronization parameter based on the correct sequence number, a third random number, the authentication management field parameter, and the symmetric key on the terminal device side. The transmitter 1201 is further configured to send a resynchronization message to the network device, where the resynchronization message includes the resynchronization parameter and the third random number, so that the network device determines the correct sequence number based on the resynchronization parameter and the third random number.

Optionally, an identity of the network device is the second random number, or an identity of the network device is carried in the authentication management field parameter. The processor 1203 is further configured to generate the symmetric key on the terminal device side based on the identity of the network device and a private key of the terminal device.

Optionally, when the network device is an access network device, the receiver 1202 is further configured to receive a broadcast message sent by the network device, where the broadcast message includes an identity of the network device. The processor 1203 is further configured to generate the symmetric key on the terminal device side based on the identity of the network device and a private key of the terminal device.

This application provides a terminal device, and the terminal device may be configured to perform the method steps performed by the foregoing terminal device. Implementation principles and technical effects are similar, and details are not described herein again.

Currently, there are three network authentication manners in the 5G technology, which are respectively an extensible authentication protocol authentication and key agreement' (EAP AKA'), a 5G authentication and key agreement (5G AKA), and extensible authentication protocol-transport layer security (EAP-TLS).

Figure 13:
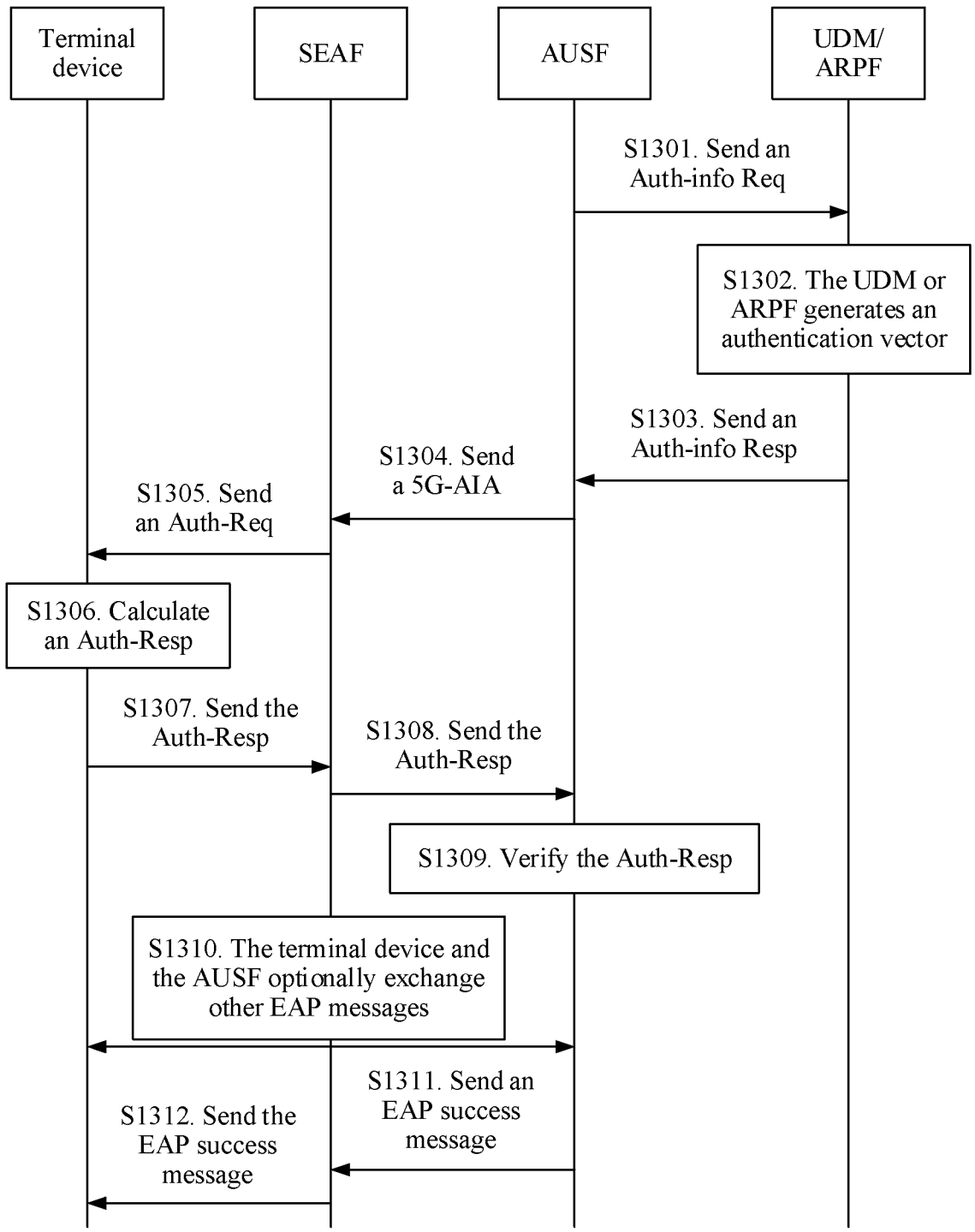
FIG. 13 is a flowchart of EAP AKA' authentication according to an embodiment of this application.

Specifically, FIG. 13 is a flowchart of EAP AKA' authentication according to an embodiment of this application. As shown in FIG. 13, an EAP AKA' authentication procedure includes the following steps.

Step S1301: An authentication server function (AUSF) sends an authentication request (Auth-info Req) to a unified data management (UDM) network element or an authentication credential repository and processing function (ARPF) network element.

Step S1302: The UDM or the ARPF generates an authentication vector.

Step S1303: The UDM or the ARPF sends an authentication response (Auth-info Resp) to the AUSF.

Step S1304: The AUSF sends a 5G authentication initiation answer (5G-AIA) to a security anchor function (SEAF).

The 5G-AIA is an EAP request, and the EAP request includes AKA'-challenge information.

Step S1305: The SEAF sends an authentication request (Auth-Req) to a terminal device.

The authentication request is an EAP request, and the EAP request includes the AKA'-challenge information.

Step S1306: The terminal device calculates an authentication response (Auth-Resp).

Step S1307: The terminal device sends the authentication response (Auth-Resp) to the SEAF.

The authentication response is an EAP response, and the EAP response includes the AKA'-challenge information.

Step S1308: The SEAF sends the authentication response (Auth-Resp) to the AUSF.

The authentication response is an EAP response, and the EAP response includes the AKA'-challenge information.

Step S1309: The AUSF verifies the authentication response (Auth-Resp).

Step S1310: The terminal device and the AUSF optionally exchange other EAP messages (Optional exchange of further EAP messages).

Step S1311: The AUSF sends an EAP success message to the SEAF.

Step S1312: The SEAF sends the EAP success message to the terminal device.

Optionally, before step S1301, the terminal device further sends an identity (ID) of the terminal device to the SEAF, the SEAF forwards the ID of the terminal device to the AUSF, and the AUSF forwards the ID of the terminal device to the ARPF. The ID of the terminal device may be an IMSI of the terminal device, or may be a subscription permanent identifier (SUPI), or may be a subscription concealed identifier (SUCI) or the like. If the ID of the terminal device is the SUCI, the ARPF needs to decrypt the SUCI. A specific decryption manner is the prior art. This is not limited in this application.

The foregoing EAP AKA' authentication manner is an existing authentication manner. Refer to a corresponding standard protocol, which is not described in detail in this application.

Figure 14:
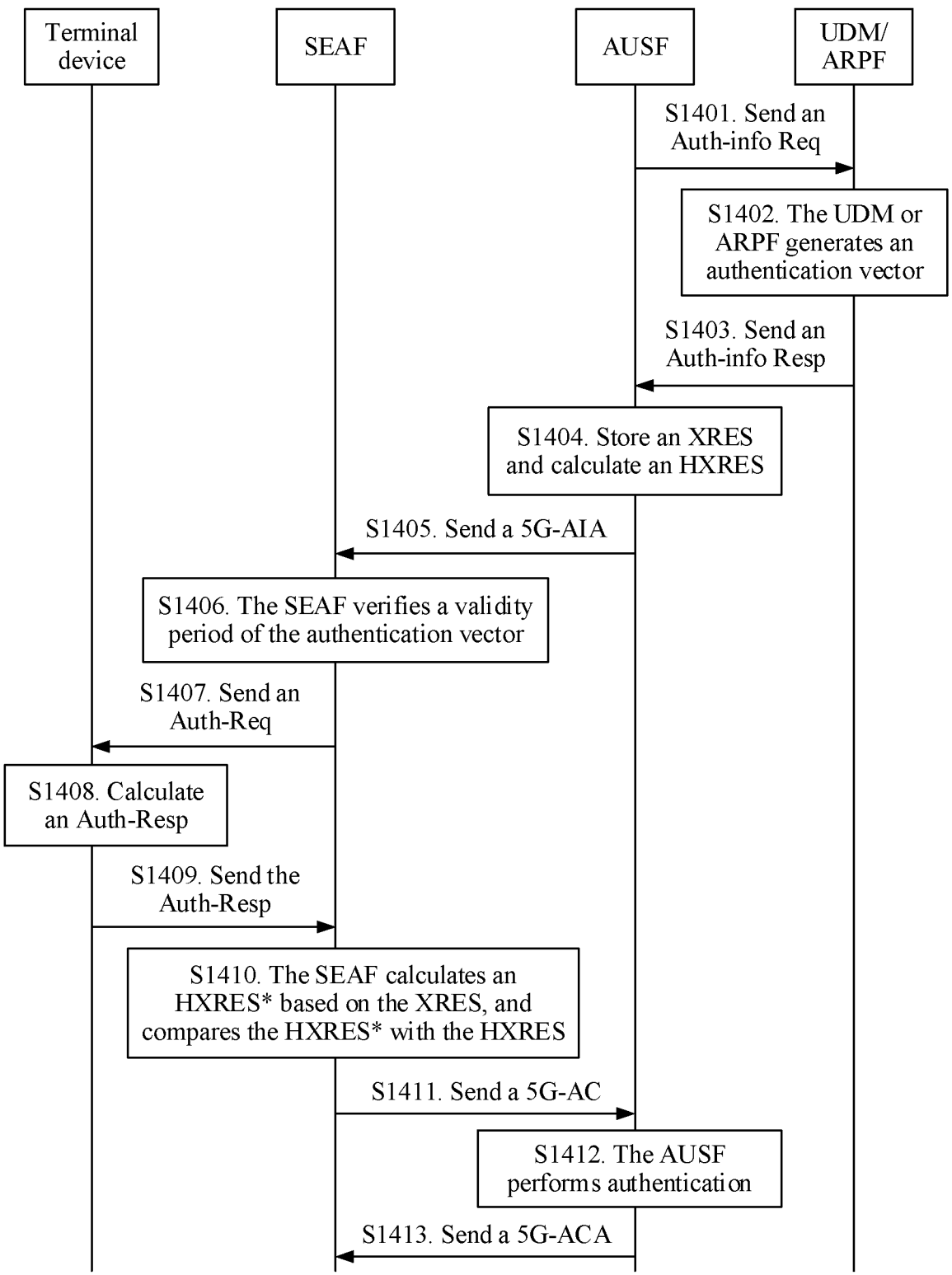
FIG. 14 is a flowchart of 5G AKA authentication according to an embodiment of this application.

FIG. 14 is a flowchart of 5G AKA authentication according to an embodiment of this application. As shown in FIG. 14, a 5G AKA authentication procedure includes the following steps.

Step S1401: An AUSF sends an authentication request (Auth-info Req) to a UDM or an ARPF.

Step S1402: The UDM or the ARPF generates an authentication vector.

Step S1403: The UDM or the ARPF sends an authentication response (Auth-info Resp) to the AUSF.

Step S1404: The AUSF stores an expected response (XRES), and calculates a hashed expected response (HXRES).

Step S1405: The AUSF sends a 5G-AIA to an SEAF.

Step S1406: The SEAF verifies a validity period of the authentication vector.

Step S1407: The SEAF sends an authentication request (Auth-Req) to a terminal device.

Step S1408: The terminal device calculates an authentication response (Auth-Resp).

Step S1409: The terminal device sends the authentication response (Auth-Resp) to the SEAF.

Step S1410: The SEAF calculates an HXRES* based on the XRES, and compares the HXRES* with the HXRES.

Step S1411: The SEAF sends a 5G authentication confirmation (5G-AC) message to the AUSF.

Step S1412: The AUSF performs authentication.

Step S1413: The AUSF sends a 5G authentication confirmation answer (5G-ACA) message to the SEAF.

Optionally, before step S1401, the terminal device further sends an ID of the terminal device to the SEAF, the SEAF forwards the ID of the terminal device to the AUSF, and the AUSF forwards the ID of the terminal device to the ARPF. The ID of the terminal device may be an IMSI of the terminal device, or may be an SUPI, or may be an SUCI, or the like. If the ID of the terminal device is the SUCI, the ARPF needs to decrypt the SUCI. A specific decryption manner is the prior art. This is not limited in this application.

The foregoing 5G AKA authentication manner is an existing authentication manner. Refer to a corresponding standard protocol, which is not described in detail in this application.

Figure 15A:
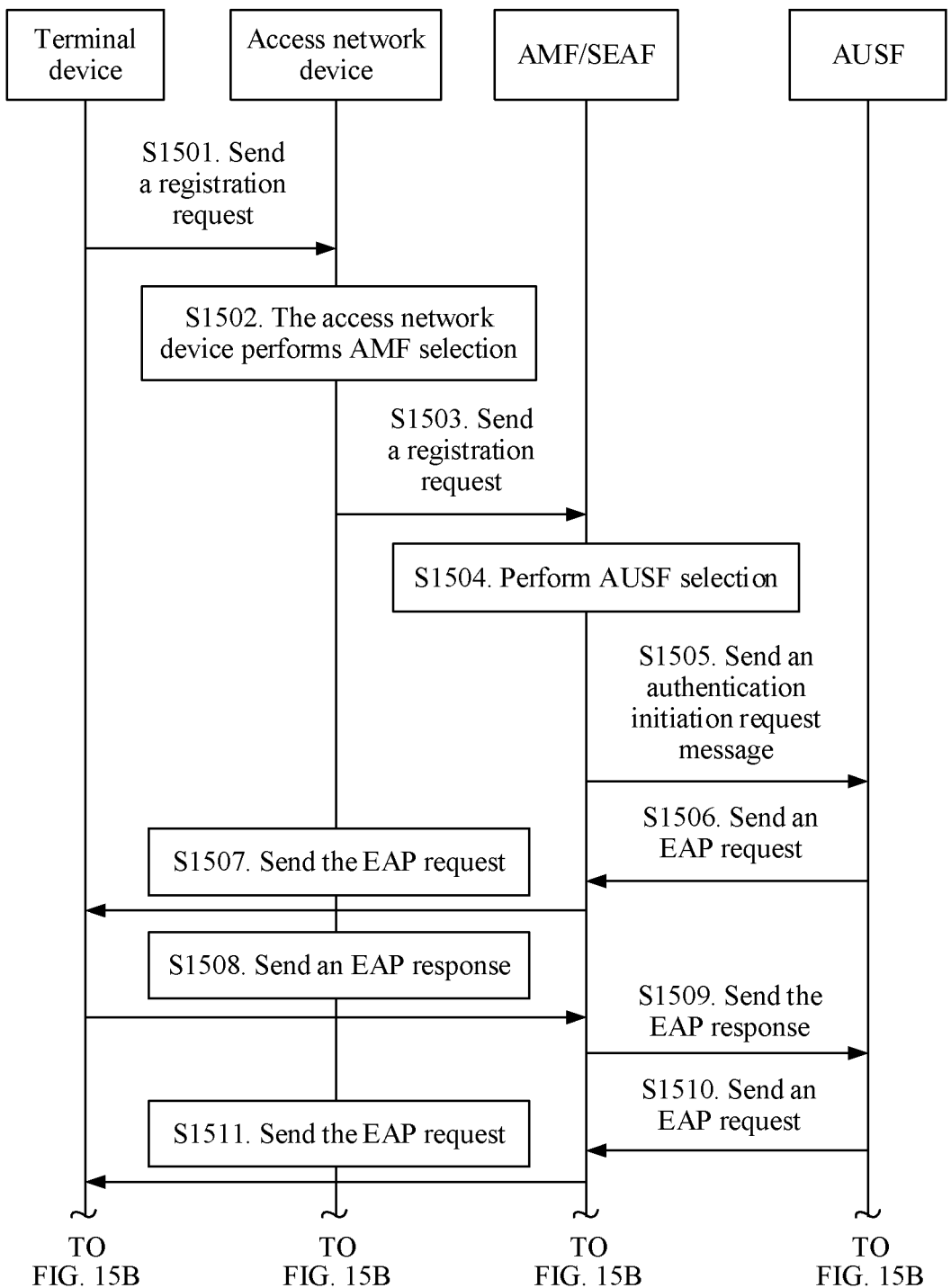
FIG. 15A and FIG. 15B are a flowchart of EAP-TLS authentication according to an embodiment of this application.
Figure 15B:
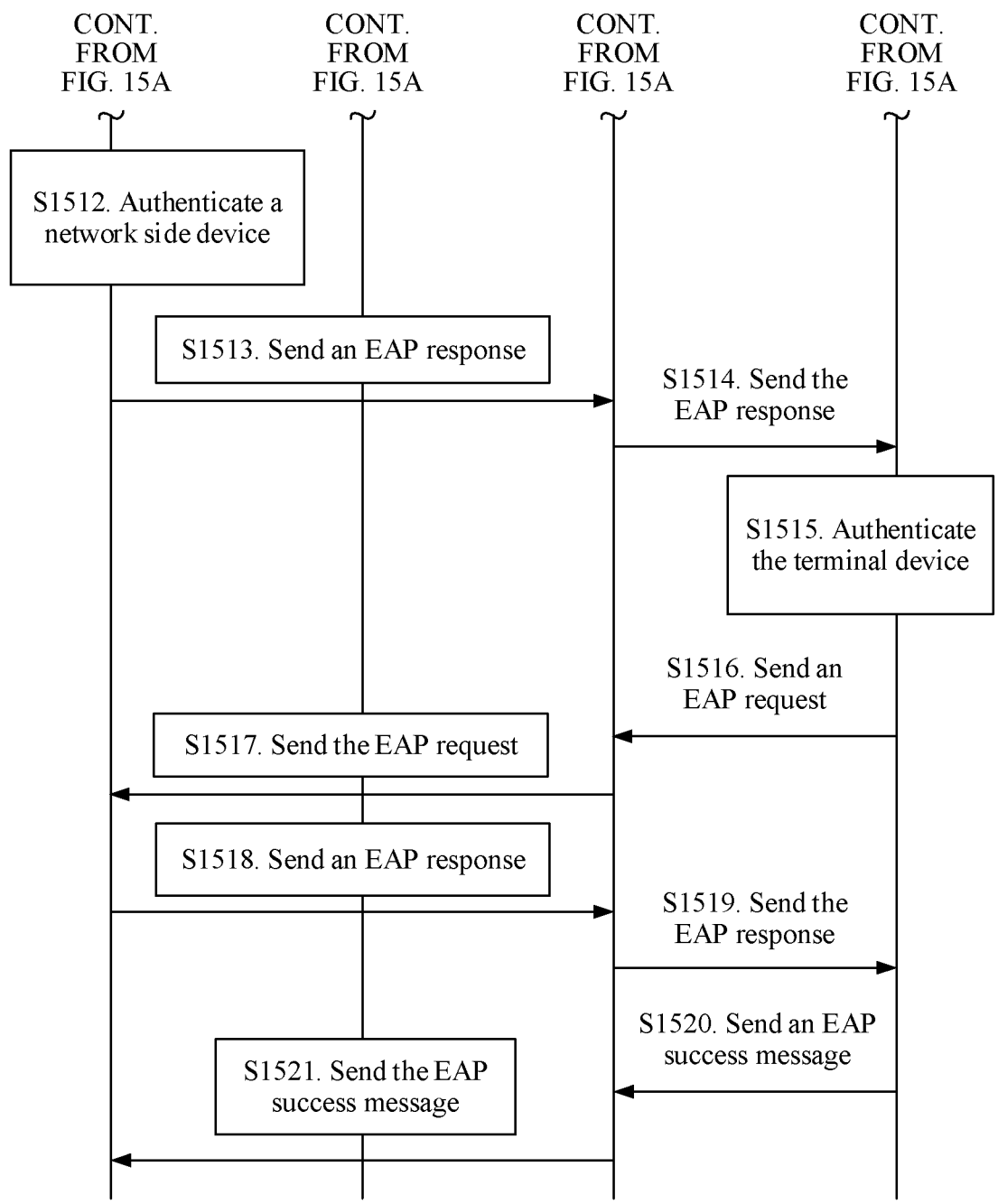

FIG. 15A and FIG. 15B are a flowchart of EAP-TLS authentication according to an embodiment of this application. As shown in FIG. 15A and FIG. 15B, an EAP-TLS authentication procedure includes the following steps.

Step S1501: A terminal device sends a registration request to an access network device.

Step S1502: The access network device performs AMF selection.

Step S1503: The access network device sends the registration request to an AMF or an SEAF.

Step S1504: The AMF or the SEAF performs AUSF selection.

Step S1505: The AMF or the SEAF sends an authentication initiation request message to an AUSF.

Step S1506: The AUSF sends an EAP request to the AMF or the SEAF.

The EAP request is a TLS start message.

Step S1507: The AMF or the SEAF sends the EAP request to the terminal device.

Step S1508: The terminal device sends an EAP response to the AMF or the SEAF.

The EAP response is a TLS client hello message.

Step S1509: The AMF or the SEAF sends the EAP response to the AUSF.

Step S1510: The AUSF sends an EAP request to the AMF or the SEAF.

The EAP request includes a TLS server_hello message, a TLS certificate, a TLS server_key_exchange (TLS server_key_exchange) parameter, a TLS certificate_request message, and a TLS server_hello_done message.

Step S1511: The AMF or the SEAF sends the EAP request to the terminal device.

The EAP request includes the TLS server_hello message, the TLS certificate, the TLS server_key_exchange (TLS server_key_exchange) message, the TLS certificate_request message, and the TLS server_hello_done message.

Step S1512: The terminal device authenticates the network side device (UE authenticate network).

Step S1513: The terminal device sends an EAP response to the AMF or the SEAF.

The EAP response includes a TLS certificate, a TLS client_key_exchange parameter, TLS certificate_verify (, TLS change_cipher_spec, and a TLS finished message.

Step S1514: The AMF or the SEAF sends the EAP response to the AUSF.

The EAP response includes the TLS certificate, the TLS client_key_exchange parameter, the TLS certificate_verify, the TLS change_cipher_spec, and the TLS finished message.

Step S1515: The AUSF authenticates the terminal device.

Step S1516: The AUSF sends an EAP request to the AMF or the SEAF.

The EAP request includes the TLS change_cipher_spec (TLS change_cipher_spec) and the TLS finished message.

Step S1517: The AMF or the SEAF sends the EAP request to the terminal device.

The EAP request includes the TLS change_cipher_spec and the TLS finished message.

Step S1518: The terminal device sends an EAP response to the AMF or the SEAF.

Step S1519: The AMF or the SEAF sends the EAP response to the AUSF.

Step S1520: The AUSF sends an EAP success message to the AMF or the SEAF.

Step S1521: The AMF or the SEAF sends the EAP success message to the terminal device.

Optionally, in step S1501, the registration request may carry an ID of the terminal device, and the ID of the terminal device may be an IMSI of the terminal device, or may be an SUPI, or may be an SUCI, or the like. If the ID of the terminal device is the SUCI, the ARPF needs to decrypt the SUCI. A specific decryption manner is the prior art. This is not limited in this application.

Further, a certificate (TLS Certificate) of the terminal device is further used in steps S1510, S1511, and the like. The prior art may be used to protect the certificate.

In an optional manner, two rounds of TLS are performed, the first round of TLS is used to establish a secure channel, and the second round of TLS is used for authentication. To be specific, in the first round of TLS, the terminal device transmits an empty certificate to establish a secure channel; and in the second round, the terminal device transmits a real certificate for authentication. The foregoing steps S1508 to S1515, or the steps S1508 to S1519, or the steps S1508 to S1521, or the steps S1510 to S1515, or the steps S1510 to S1519, or the steps S1510 to S1521 are a process of the second round of TLS. Optionally, before step S1508 or step S1510, transmission of an empty certificate is further performed. A specific manner is that a certificate is not transmitted during TLS exchange, and only key negotiation is performed.

In another optional manner, the terminal device and the network side device first perform key negotiation, and during certificate transmission, the terminal device and the network side device may encrypt and transmit the certificate by using a negotiated key.

The foregoing EAP-TLS authentication manner is an existing authentication manner. Refer to a corresponding standard protocol, which is not described in detail in this application.

If the 5G network authentication technology has only this two authentication methods: EAP AKA' and 5G AKA, the AUSF may determine, in two manners, which network authentication manner is used, that is, determine which authentication manner is used based on a message responded by the ARPF:

Method 1: Based on whether a separation bit in the AMF is 1, determining whether EAP AKA' authentication or 5G AKA authentication is used.

Method 2: Determining based on an authentication vector format, where an authentication vector of the EAP AKA' has five parameters, and an authentication vector of the 5G AKA has four parameters.

However, at present, there are the foregoing three network authentication manners, and even more. For the ARPF or the UDM, how to notify the AUSF of a specific network authentication manner is an urgent technical problem to be resolved in the embodiments of this application.

Figure 16:
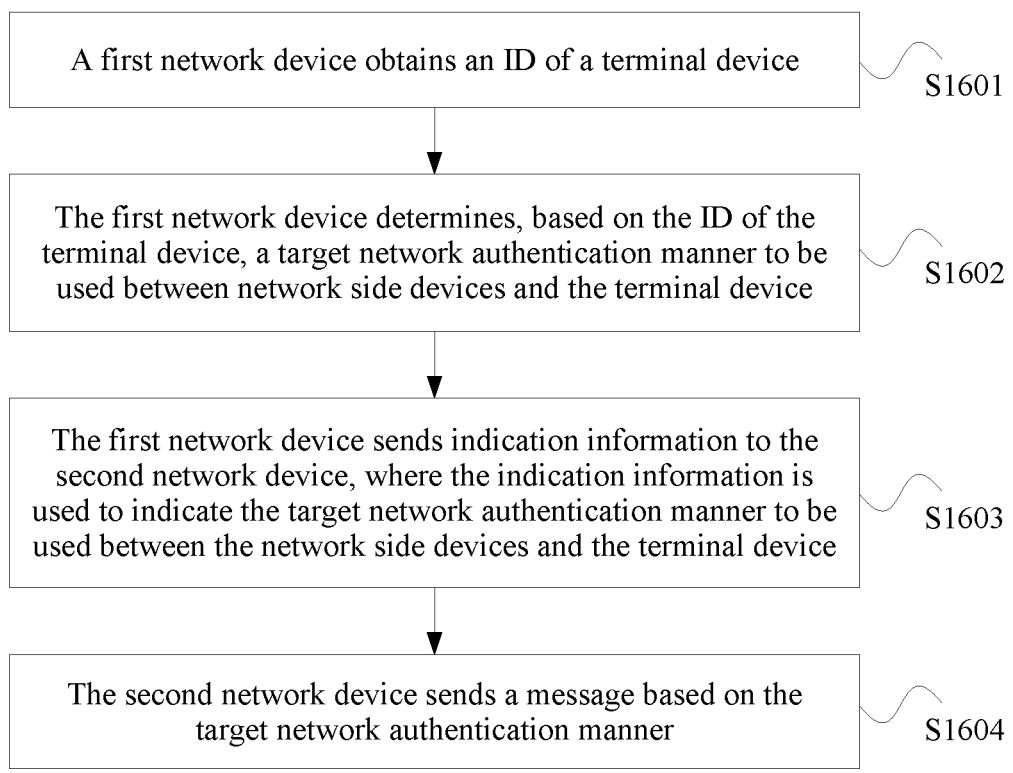
FIG. 16 is a flowchart of a network authentication method according to an embodiment of this application.

Specifically, FIG. 16 is a flowchart of a network authentication method according to an embodiment of this application. As shown in FIG. 16, the method includes the following steps.

Step S1601: A first network device obtains an ID of a terminal device.

The first network device may be an ARPF or a UDM, or a network element that has a similar function to the ARPF or the UDM. This is not limited in this application.

The first network device may obtain a registration message of the terminal device, where the registration message includes the ID of the terminal device, and the ID of the terminal device may be an IMSI of the terminal device, or may be an SUPI, or may be an SUCI, or the like. If the ID of the terminal device is the SUCI, the ARPF needs to decrypt the SUCI. A specific decryption manner is the prior art. This is not limited in this application.

Step S1602: The first network device determines, based on the ID of the terminal device, a target network authentication manner to be used between network side devices and the terminal device.

The first network device may store a mapping relationship between an ID of each terminal device and a network authentication manner. The mapping relationship may be stored in a table form. Based on this, the first network device may determine, through table querying, the target network authentication manner corresponding to the ID of the terminal device. This application sets no limitation on how the first network device determines the target network authentication manner.

The network side devices include the first network device and a second network device.

The target network authentication manner is any one of EAP AKA', 5G AKA, and EAP-TLS. Certainly, the target network authentication manner may be the network authentication methods in the embodiments corresponding to FIG. 3A to FIG. 9, and this application sets no limitation on the target network authentication manner.

Step S1603: The first network device sends indication information to the second network device, where the indication information is used to indicate the target network authentication manner to be used between the network side devices and the terminal device.

The second network device may be an AUSF or a network element that has a similar function to the AUSF. This is not limited in this application.

The indication information may be carried in an authentication vector sent by the first network device to the second network device, or the first network device may separately send the indication information to the second network device. If there are three existing network authentication manners, such as EAP AKA', 5G AKA, and EAP-TLS, a length of the indication information is 2 bits. For example, if the indication information is carried in the authentication vector, the two bits are a separation bit and an EAP-TLS indication bit, to jointly indicate whether EAP-TLS is used. Specifically, if the separation bit is 0, it indicates that 5G AKA is used. If the separation bit is 1 and the EAP-TLS indication bit is 0, it indicates that EAP AKA' is used. If the separation bit is 1 and the EAP-TLS indication bit is 1, it indicates that EAP-TLS is used.

Step S1604: The second network device sends a message based on the target network authentication manner.

When the target network authentication manner is EAP AKA', the message sent by the second network device is an authentication request (Auth-info Req). For example, step S1601 may be performed before step S1301, and step S1301 is equivalent to step S1604.

When the target network authentication manner is 5G AKA, the message sent by the second network device is an authentication request (Auth-info Req). For example, step S1601 may be performed before step S1401, and step S1401 is equivalent to step S1604.

Figure 17A:
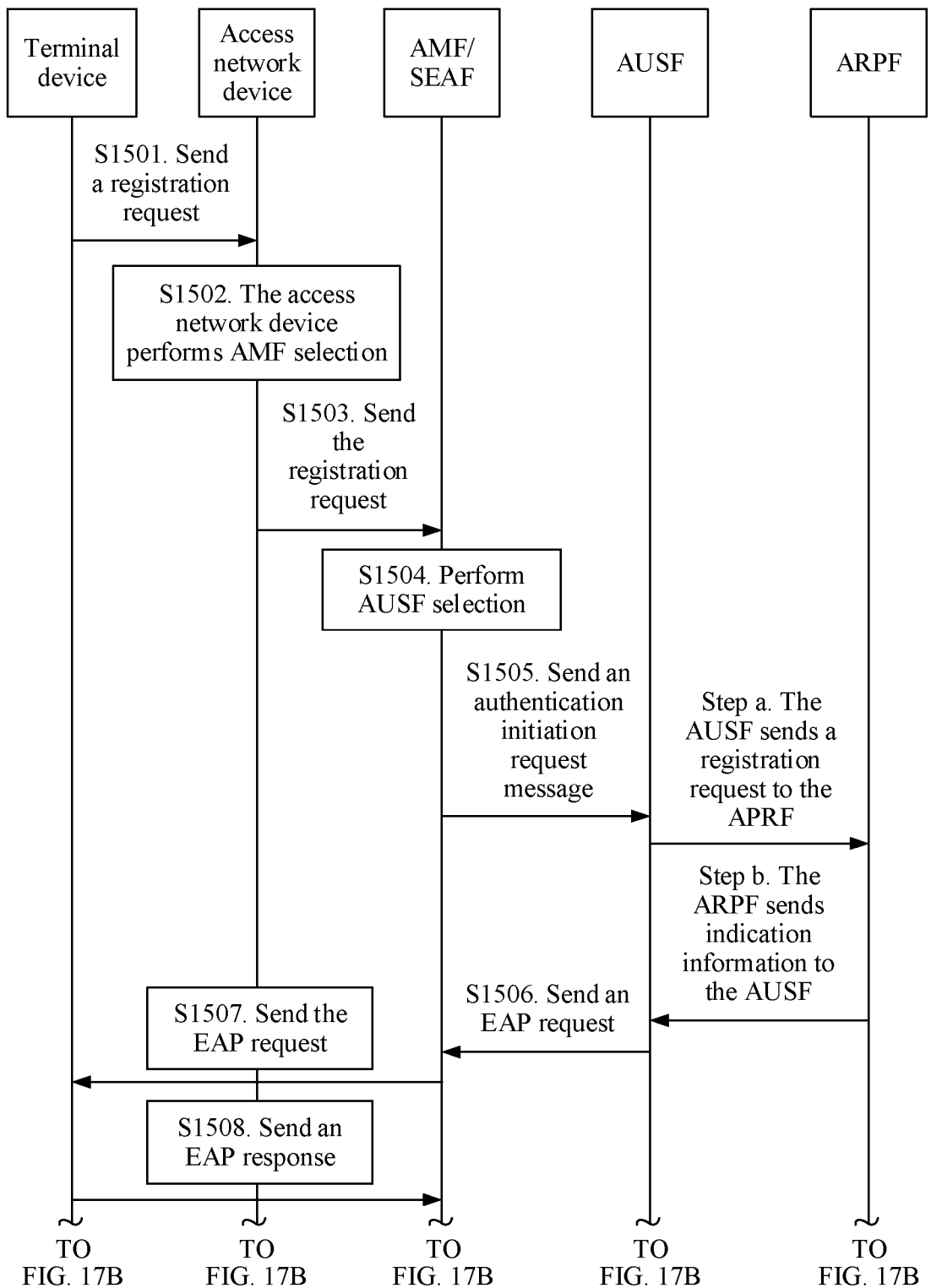
FIG. 17A and FIG. 17B are an interaction flowchart of a network authentication method according to an embodiment of this application.
Figure 17B:
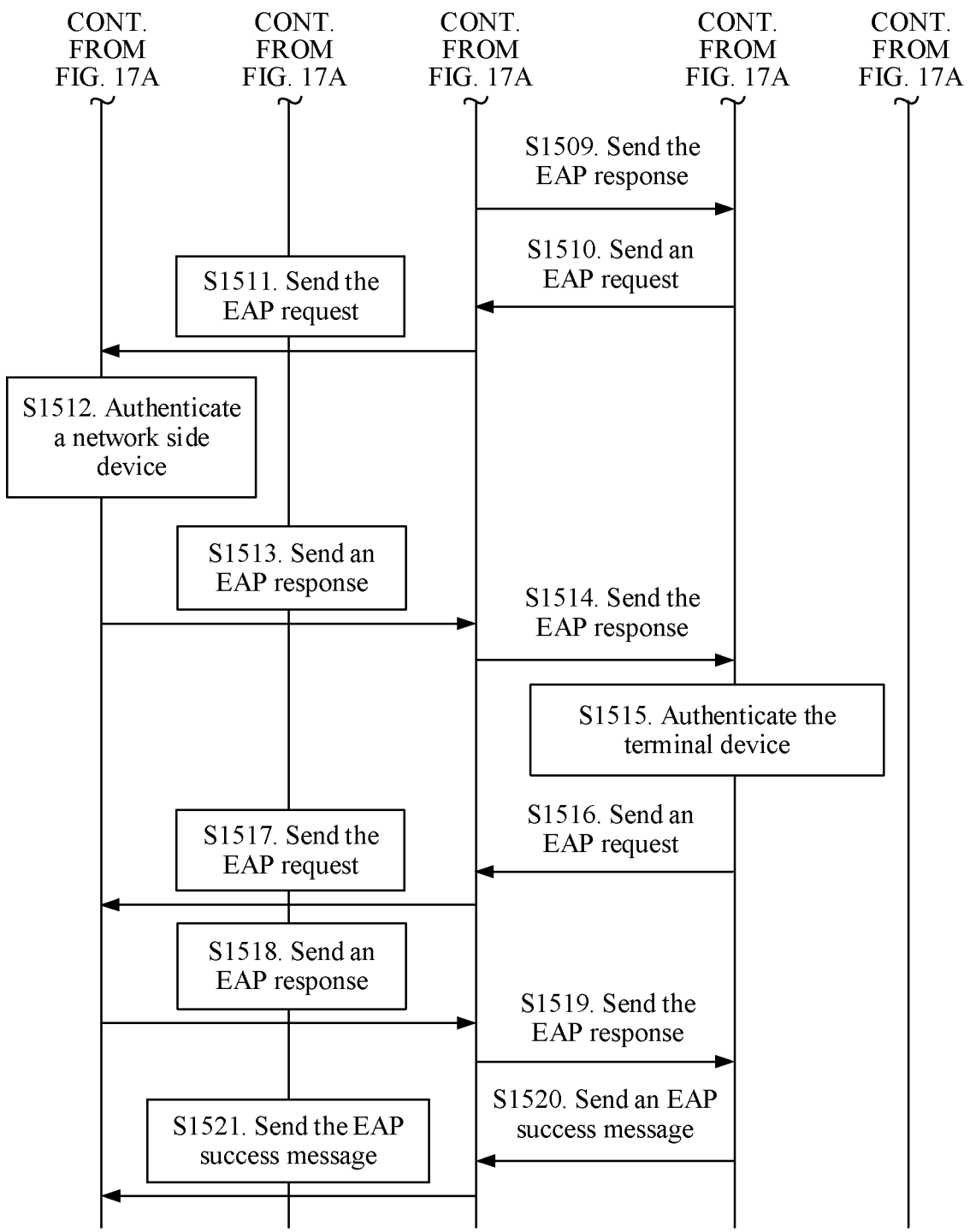

When the target network authentication manner is EAP-TLS, the message sent by the second network device is EAP request. For example, FIG. 17A and FIG. 17B are an interaction flowchart of a network authentication method according to an embodiment of this application. Based on FIG. 15A and FIG. 15B, before step S1506, the method further includes: Step a: The AUSF sends a registration request (Registration Request) to the APRF. Step b: The ARPF sends indication information to the AUSF. As described above, the ARPF may separately send the indication information to the AUSF, or add the indication information to an authentication vector sent by the ARPF to the AUSF. When the AUSF determines, according to the indication information, that the target network authentication manner is EAP-TLS, step S1506 is equivalent to step S1604.

This application provides a network authentication method. The indication information may indicate the target network authentication manner to be used between the network side devices and the terminal device, so that the network side devices and the terminal device perform network authentication in the target network authentication manner.

For the ARPF or the UDM, how to notify the AUSF whether to use the target network authentication manner such as EAP-TLS is another technical problem that needs to be urgently resolved in the embodiments of this application.

Figure 18:
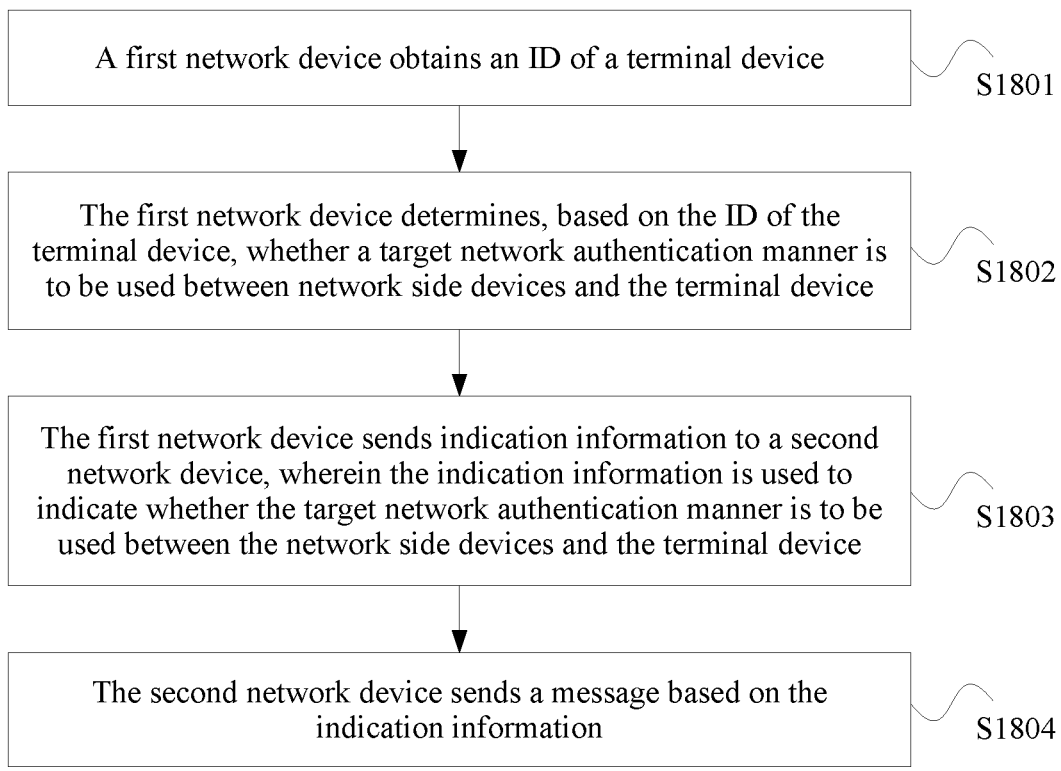
FIG. 18 is a flowchart of a network authentication method according to another embodiment of this application.

Specifically, FIG. 18 is a flowchart of a network authentication method according to another embodiment of this application. As shown in FIG. 18, the method includes the following steps.

Step S1801: A first network device obtains an ID of a terminal device.

The first network device may be an ARPF or a UDM, or a network element that has a similar function to the ARPF or the UDM. This is not limited in this application.

The first network device may obtain a registration message of the terminal device, where the registration message includes the ID of the terminal device, and the ID of the terminal device may be an IMSI of the terminal device, or may be an SUPI, or may be an SUCI, or the like. If the ID of the terminal device is the SUCI, the ARPF needs to decrypt the SUCI. A specific decryption manner is the prior art. This is not limited in this application.

Step S1802: The first network device determines, based on the ID of the terminal device, whether a target network authentication manner is to be used between network side devices and the terminal device.

The first network device may store a mapping relationship between an ID of each terminal device and a network authentication manner. The mapping relationship may be stored in a table form. Based on this, the first network device may determine, through table querying, whether the target network authentication manner is to be used between the network side devices and the terminal device. This application sets no limitation on how the first network device determines whether the target network authentication manner is to be used between the network side devices and the terminal device.

The network side devices include the first network device and a second network device.

The target network authentication manner is any one of EAP AKA', 5G AKA, and EAP-TLS. Certainly, the target network authentication manner may be the network authentication methods in the embodiments corresponding to FIG. 3A to FIG. 9, and this application sets no limitation on the target network authentication manner.

Step S1803: The first network device sends indication information to the second network device, where the indication information is used to indicate whether the target network authentication manner is to be used between the network side devices and the terminal device.

The second network device may be an AUSF or a network element that has a similar function to the AUSF. This is not limited in this application.

The indication information may be carried in an authentication vector sent by the first network device to the second network device, or the first network device may separately send the indication information to the second network device. If the indication information is carried in the authentication vector, a length of the indication information may be 1 bit, and the 1 bit is an EAP-TLS indication bit. Specifically, if the EAP-TLS indication bit is 0, it indicates that EAP-TLS is not used. If the EAP-TLS indication bit is 1, it indicates that EAP-TLS is used.

Step S1804: The second network device sends a message based on the indication information.

When the target network authentication manner is EAP AKA', the message sent by the second network device is an authentication request. For example, step S1801 may be performed before step S1301, and step S1301 is equivalent to step S1804.

When the target network authentication manner is 5G AKA, the message sent by the second network device is an authentication request. For example, step S1801 may be performed before step S1401, and step S1401 is equivalent to step S1804.

Figure 19A:
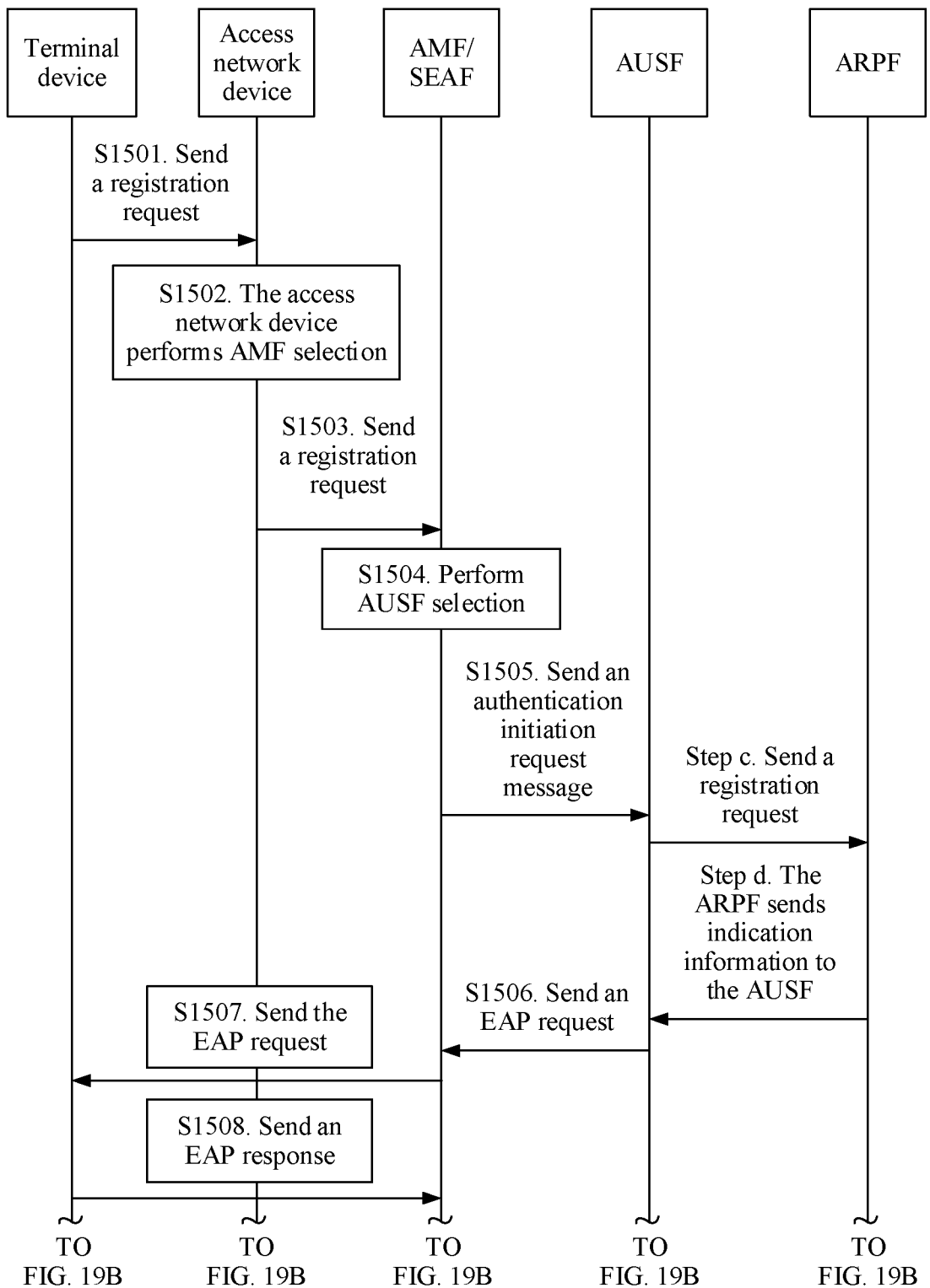
FIG. 19A and FIG. 19B are an interaction flowchart of a network authentication method according to an embodiment of this application.
Figure 19B:
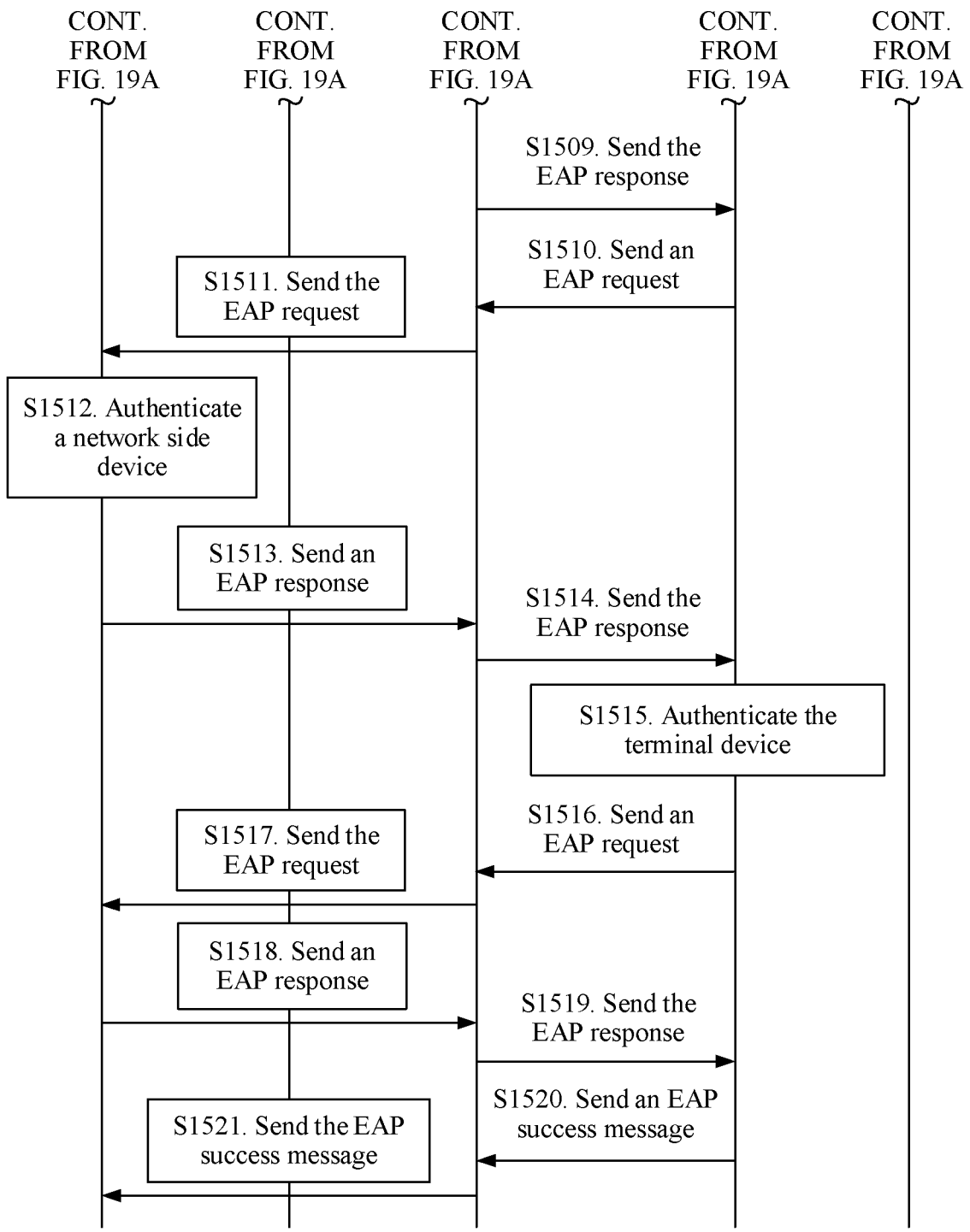

When the target network authentication manner is EAP-TLS, the message sent by the second network device is EAP request. For example, FIG. 19A and FIG. 19B are an interaction flowchart of a network authentication method according to an embodiment of this application. Based on FIG. 15A and FIG. 15B, before step S1506, the method further includes: Step c: The AUSF sends a registration request to the APRF. Step d: The ARPF sends indication information to the AUSF. As described above, the ARPF may separately send the indication information to the AUSF, or add the indication information to an authentication vector sent by the ARPF to the AUSF. When the AUSF determines, according to the indication information, that the target network authentication manner is EAP-TLS, step S1506 is equivalent to step S1804.

This application provides a network authentication method. The indication information is used to indicate whether the target network authentication manner is to be used between the network side devices and the terminal device, so that the network side devices and the terminal device perform network authentication in the target network authentication manner.

Figure 20:
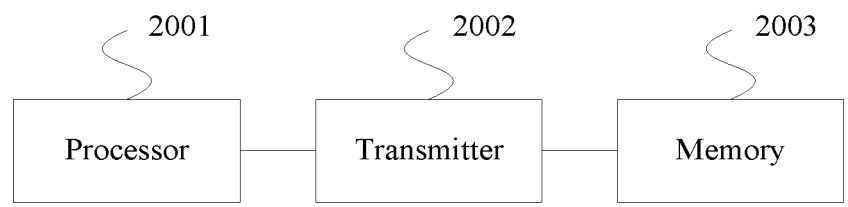
FIG. 20 is a schematic structural diagram of a network device according to an embodiment of this application.

FIG. 20 is a schematic structural diagram of a network device according to an embodiment of this application. As shown in FIG. 20, the network device includes a processor 2001, a transmitter 2002, and a memory 2003.

The memory 2003 is configured to store code. When the code is run by the processor 2001, the processor 2001 is configured to: obtain an identifier of a terminal device; and determine, based on the identifier of the terminal device, a target network authentication manner to be used between network side devices and the terminal device.

The transmitter 2002 is configured to send indication information to a second network device, where the indication information is used to indicate the target network authentication manner.

The network device provided in this application may be configured to execute the method corresponding to the first network device in the embodiment corresponding to FIG. 16. Content and effects of the method are not described in this application again.

Figure 21:
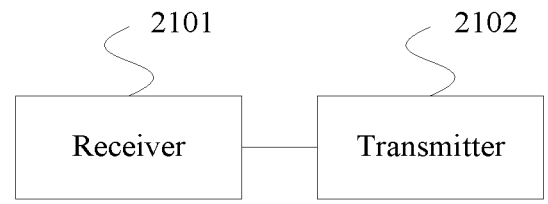
FIG. 21 is a schematic structural diagram of a network device according to another embodiment of this application.

FIG. 21 is a schematic structural diagram of a network device according to another embodiment of this application. As shown in FIG. 21, the network device includes:

a receiver 2101, configured to receive indication information, where the indication information is used to indicate a target network authentication manner to be used between network side devices and a terminal device; and a transmitter 2102, configured to send a message based on the target network authentication manner.

The network device provided in this application may be configured to execute the method corresponding to the second network device in the embodiment corresponding to FIG. 16. Content and effects of the method are not described in this application again.

Figure 22:
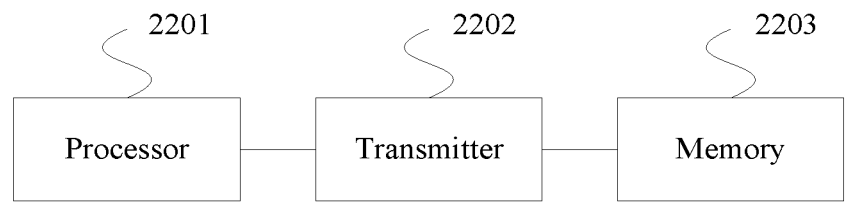
FIG. 22 is a schematic structural diagram of a network device according to still another embodiment of this application.

FIG. 22 is a schematic structural diagram of a network device according to still another embodiment of this application. As shown in FIG. 22, the network device includes a processor 2201, a transmitter 2202, and a memory 2203.

The memory 2203 is configured to store code. When the code is run by the processor 2201, the processor 2201 is configured to: obtain an identifier of a terminal device; and determine, based on the identifier of the terminal device, whether a target network authentication manner is to be used between network side devices and the terminal device.

The transmitter 2202 is configured to send indication information to a second network device, where the indication information is used to indicate whether the target network authentication manner is to be used between the network side devices and the terminal device.

The network device provided in this application may be configured to execute the method corresponding to the first network device in the embodiment corresponding to FIG. 18. Content and effects of the method are not described in this application again.

Figure 23:
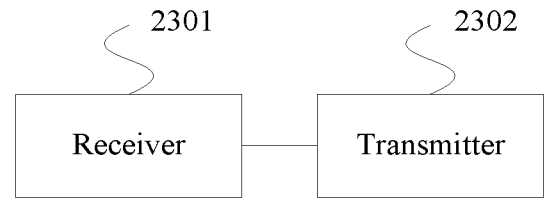
FIG. 23 is a schematic structural diagram of a network device according to yet another embodiment of this application.

FIG. 23 is a schematic structural diagram of a network device according to yet another embodiment of this application. As shown in FIG. 23, the network device includes:

a receiver 2301, configured to receive indication information, where the indication information is used to indicate whether a target network authentication manner is to be used between network side devices and a terminal device; and a transmitter 2302, configured to send a message based on the indication information.

The network device provided in this application may be configured to execute the method corresponding to the second network device in the embodiment corresponding to FIG. 18. Content and effects of the method are not described in this application again.

What is claimed is:

1. A network authentication method, comprising:
   obtaining, by a network device, an identity of a terminal device;
   generating, by the network device, a symmetric key on the network device side based on the identity of the terminal device and a first key of the network device;
   generating, by the network device, a first sequence number for the terminal device;
   determining, by the network device, a correct sequence number of the terminal device based on the first sequence number;
   generating, by the network device, a first authentication token based on the symmetric key on the network device side, the correct sequence number, a first random number, and an authentication management field parameter configured by the network device for the terminal device, wherein the authentication management field parameter is used to limit parameters involved in the network authentication process of the terminal device;
   sending, by the network device, the first random number and the first authentication token to the terminal device, so that the terminal device authenticates the network device based on the first authentication token and a second authentication token, wherein the second authentication token is generated by the terminal device based on a symmetric key on the terminal device side, the first random number, the correct sequence number, and the authentication management field parameter;
   receiving, by the network device, an authentication response message sent by the terminal device, wherein the authentication response message comprises a first authentication parameter, and the first authentication parameter is generated based on the first random number and the symmetric key on the terminal device side;
   generating, by the network device, a second authentication parameter based on the symmetric key on the network device side and the first random number; and
   authenticating, by the network device, the terminal device based on the first authentication parameter and the second authentication parameter.

2. The method according to claim 1, wherein the first key is a private key of the network device, or the first key is a public key corresponding to a plurality of terminal devices that comprise the terminal device.

3. The method according to claim 1, wherein the first sequence number is a sequence number generated by the network device based on current time information, and the first sequence number is the same as the correct sequence number.

4. The method according to claim 1, wherein the first sequence number is a pseudo sequence number of the terminal device; and
   correspondingly, the determining, by the network device, a correct sequence number of the terminal device based on the first sequence number comprises:
   generating, by the network device, a third authentication token based on the symmetric key on the network device side, the pseudo sequence number, a second random number, and the authentication management field parameter;
   sending, by the network device, the second random number and the third authentication token to the terminal device, so that the terminal device determines the pseudo sequence number based on the symmetric key on the terminal device side, the third authentication token, the second random number, and the authentication management field parameter;
   receiving, by the network device, a resynchronization message sent by the terminal device, wherein the resynchronization message comprises a resynchronization parameter and a third random number; and
   determining, by the network device, the correct sequence number based on the resynchronization parameter and the third random number.

5. A network authentication method, comprising:
   sending, by a terminal device, an identity of the terminal device to a network device, so that the network device generates a symmetric key on the network device side based on the identity of the terminal device and a first key of the network device;
   receiving, by the terminal device, a first random number and a first authentication token that are sent by the network device, wherein the first authentication token is generated by the network device based on the symmetric key on the network device side, a correct sequence number of the terminal device, the first random number, and an authentication management field parameter configured by the network device for the terminal device, and the authentication management field parameter is used to limit parameters involved in the network authentication process of the terminal device;
   determining, by the terminal device, the correct sequence number based on the first authentication token, a symmetric key on the terminal device side, the first random number, and the authentication management field parameter;
   generating, by the terminal device, a second authentication token based on the symmetric key on the terminal device side, the first random number, the correct sequence number, and the authentication management field parameter;
   authenticating, by the terminal device, the network device based on the first authentication token and the second authentication token;
   generating, by the terminal device, a first authentication parameter based on the first random number and the symmetric key on the terminal device side; and sending, by the terminal device, an authentication response message to the network device, wherein the authentication response message comprises the first authentication parameter; and the first authentication parameter is used by the network device to authenticate the terminal device.

6. The method according to claim 5, wherein the first key is a private key of the network device, or the first key is a public key corresponding to a plurality of terminal devices that comprise the terminal device.

7. The method according to claim 5, wherein the correct sequence number is determined by the network device by using a first sequence number.

8. The method according to claim 7, wherein the first sequence number is a sequence number generated by the network device based on current time information, and the first sequence number is the same as the correct sequence number.

9. The method according to claim 7, wherein the first sequence number is a pseudo sequence number of the terminal device; and
the method further comprises:
receiving, by the terminal device, a second random number and a third authentication token that are sent by the network device, wherein the third authentication token is generated by the network device based on the symmetric key on the network device side, the pseudo sequence number, the second random number, and the authentication management field parameter;
determining, by the terminal device, the pseudo sequence number based on the symmetric key on the terminal device side, the third authentication token, the second random number, and the authentication management field parameter;
generating, by the terminal device, a resynchronization parameter based on the correct sequence number, a third random number, the authentication management field parameter, and the symmetric key on the terminal device side; and
sending, by the terminal device, a resynchronization message to the network device, wherein the resynchronization message comprises the resynchronization parameter and the third random number, so that the network device determines the correct sequence number based on the resynchronization parameter and the third random number.

10. The method according to claim 9, wherein an identity of the network device is the second random number, or an identity of the network device is carried in the authentication management field parameter; and
the method further comprises: generating, by the terminal device, the symmetric key on the terminal device side based on the identity of the network device and a private key of the terminal device.

11. A network device, comprising a processor, a receiver, a transmitter, and a memory, wherein
the memory is configured to store code in a non-transitory computer-readable medium, and when the code is run by the processor, the processor is configured to:
obtain an identity of a terminal device;
generate a symmetric key on the network device side based on the identity of the terminal device and a first key of the network device;
generate a first sequence number for the terminal device;
determine a correct sequence number of the terminal device based on the first sequence number; and
generate a first authentication token based on the symmetric key on the network device side, the correct sequence number, a first random number, and an authentication management field parameter configured by the network device for the terminal device, wherein the authentication management field parameter is used to limit parameters involved in the network authentication process of the terminal device;
the transmitter is configured to send the first random number and the first authentication token to the terminal device, so that the terminal device authenticates the network device based on the first authentication token and a second authentication token, wherein the second authentication token is generated by the terminal device based on a symmetric key on the terminal device side, the first random number, the correct sequence number, and the authentication management field parameter;
the receiver is configured to receive an authentication response message sent by the terminal device, wherein the authentication response message comprises a first authentication parameter, and the first authentication parameter is generated based on the first random number and the symmetric key on the terminal device side; and
the processor is further configured to:
generate a second authentication parameter based on the symmetric key on the network device side and the first random number; and
authenticate the terminal device based on the first authentication parameter and the second authentication parameter.

12. The network device according to claim 11, wherein the first key is a private key of the network device, or the first key is a public key corresponding to a plurality of terminal devices that comprise the terminal device.

13. The network device according to claim 11, wherein the first sequence number is a sequence number generated by the network device based on current time information, and the first sequence number is the same as the correct sequence number.

14. The network device according to claim 11, wherein the first sequence number is a pseudo sequence number of the terminal device;
correspondingly, the processor is specifically configured to generate a third authentication token based on the symmetric key on the network device side, the pseudo sequence number, a second random number, and the authentication management field parameter;
the transmitter is further configured to send the second random number and the third authentication token, so that the terminal device determines the pseudo sequence number based on the symmetric key on the terminal device side, the third authentication token, the second random number, and the authentication management field parameter;
the receiver is further configured to receive a resynchronization message sent by the terminal device, wherein the resynchronization message comprises a resynchronization parameter and a third random number; and
the processor is specifically configured to determine the correct sequence number based on the resynchronization parameter and the third random number.

15. A terminal device, comprising a transmitter, a receiver, a processor, and a memory, wherein
the transmitter is configured to send an identity of the terminal device to a network device, so that the network device generates a symmetric key on the network device side based on the identity of the terminal device and a first key of the network device;

the receiver is configured to receive a first random number and a first authentication token that are sent by the network device, wherein the first authentication token is generated by the network device based on the symmetric key on the network device side, a correct sequence number of the terminal device, the first random number, and an authentication management field parameter configured by the network device for the terminal device, and the authentication management field parameter is used to limit parameters involved in the network authentication process of the terminal device;

the memory is configured to store code in a non-transitory computer-readable medium, and when the code is run by the processor, the processor is configured to:

determine the correct sequence number based on the first authentication token, a symmetric key on the terminal device side, the first random number, and the authentication management field parameter;

generate a second authentication token based on the symmetric key on the terminal device side, the first random number, the correct sequence number, and the authentication management field parameter;

authenticate the network device based on the first authentication token and the second authentication token; and generate a first authentication parameter based on the first random number and the symmetric key on the terminal device side; and the transmitter is further configured to send an authentication response message to the network device, wherein the authentication response message comprises the first authentication parameter; and the first authentication parameter is used by the network device to authenticate the terminal device.

16. The terminal device according to claim 15, wherein the first key is a private key of the network device, or the first key is a public key corresponding to a plurality of terminal devices that comprise the terminal device.

17. The terminal device according to claim 15, wherein the correct sequence number is determined by the network device by using a first sequence number.

18. The terminal device according to claim 17, wherein the first sequence number is a sequence number generated by the network device based on current time information, and the first sequence number is the same as the correct sequence number.

19. The terminal device according to claim 17, wherein the first sequence number is a pseudo sequence number of the terminal device;

the receiver is further configured to receive a second random number and a third authentication token that are sent by the network device, wherein the third authentication token is generated by the network device based on the symmetric key on the network device side, the pseudo sequence number, the second random number, and the authentication management field parameter;

the processor is further configured to:

determine the pseudo sequence number based on the symmetric key on the terminal device side, the third authentication token, the second random number, and the authentication management field parameter; and generate a resynchronization parameter based on the correct sequence number, a third random number, the authentication management field parameter, and the symmetric key on the terminal device side; and the transmitter is further configured to send a resynchronization message to the network device, wherein the resynchronization message comprises the resynchronization parameter and the third random number, so that the network device determines the correct sequence number based on the resynchronization parameter and the third random number.

20. The terminal device according to claim 19, wherein an identity of the network device is the second random number, or an identity of the network device is carried in the authentication management field parameter; and the processor is further configured to generate the symmetric key on the terminal device side based on the identity of the network device and a private key of the terminal device.

* * * * *